US009167318B1

(12) United States Patent
Connolly et al.

(10) Patent No.: US 9,167,318 B1
(45) Date of Patent: Oct. 20, 2015

(54) BANDWIDTH ADVERTISEMENT SYSTEMS AND METHODS FOR OPTICAL TRANSPORT NETWORK

(75) Inventors: Matthew W. Connolly, Canton, GA (US); John K. Oltman, Chamblee, GA (US); Bhavesh Nisar, Alpharetta, GA (US)

(73) Assignee: Ciena Corporation, Hanover, MD (US)

( * ) Notice: Subject to any disclaimer, the term of this patent is extended or adjusted under 35 U.S.C. 154(b) by 483 days.

(21) Appl. No.: 13/568,814

(22) Filed: Aug. 7, 2012

(51) Int. Cl.
*H04Q 11/00* (2006.01)
(52) U.S. Cl.
CPC ........... *H04Q 11/00* (2013.01); *H04Q 11/0003* (2013.01); *H04Q 11/0005* (2013.01)
(58) Field of Classification Search
CPC ...... G06F 15/173; H04B 10/08; H04B 10/04; H04J 14/00; H04J 3/22; H04L 12/56; H04L 12/403; H04L 12/28; H04L 9/32
See application file for complete search history.

(56) References Cited

U.S. PATENT DOCUMENTS

| | | | |
|---|---|---|---|
| 6,097,735 A | 8/2000 | Nemoto | |
| 6,442,138 B1 * | 8/2002 | Yin et al. | 370/232 |
| 6,785,252 B1 | 8/2004 | Zimmerman et al. | |
| 7,222,191 B2 | 5/2007 | Dolganow et al. | |
| 7,602,726 B1 | 10/2009 | Sundaresan et al. | |
| 7,672,331 B1 | 3/2010 | Cortez et al. | |
| 7,729,253 B1 | 6/2010 | Khambatkone et al. | |
| 7,849,225 B2 * | 12/2010 | Schofield et al. | 709/250 |
| 7,852,863 B2 | 12/2010 | Madrahalli et al. | |
| 8,089,866 B2 | 1/2012 | Smith et al. | |
| 8,724,991 B2 * | 5/2014 | Sarashina et al. | 398/58 |
| 8,855,487 B2 * | 10/2014 | Xie | 398/48 |
| 8,879,911 B2 * | 11/2014 | Tamai et al. | 398/58 |
| 2002/0196808 A1 * | 12/2002 | Karri et al. | 370/468 |

(Continued)

OTHER PUBLICATIONS

ITU-T G.709/Y.1331 discloses Series G: Transmission Systems and Media, Digital Systems and Networks, Digital terminal equipments—General Series Y: Global Information Infrastructure, Internet Protocol Aspects and Next-Generation Networks—Transport, Interfaces for the optical transport network, Feb. 2012.*

(Continued)

*Primary Examiner* — Andrew Lai
*Assistant Examiner* — Hoyet H Andrews
(74) *Attorney, Agent, or Firm* — Clements Bernard PLLC; Christopher L. Bernard; Lawrence A. Baratta, Jr.

(57) ABSTRACT

A bandwidth advertisement update method in an optical network, an optical network, and a controller provide a configurable mechanism for bandwidth advertisement updates in a control plane providing flexibility and reducing bandwidth advertisements in the control plane while concurrently supporting aggregated connections. The bandwidth advertisement update method includes defining a plurality of bandwidth update threshold values for a plurality of bandwidth units supported on a link in the optical network, responsive to a change in available bandwidth on the link, sending a bandwidth advertisement if the available bandwidth for any of the plurality of bandwidth units is less than the associated bandwidth update threshold value, and responsive to a change in available bandwidth on the link, withholding the bandwidth advertisement if the available bandwidth for all of the plurality of bandwidth units is greater than or equal to the associated bandwidth update threshold value.

17 Claims, 20 Drawing Sheets

(56) References Cited

U.S. PATENT DOCUMENTS

| | | |
|---|---|---|
| 2003/0206516 A1 | 11/2003 | Chen et al. |
| 2004/0190457 A1* | 9/2004 | Mohr ............................ 370/241 |
| 2005/0013297 A1* | 1/2005 | Eriksson ....................... 370/392 |
| 2006/0002385 A1* | 1/2006 | Johnsen et al. ............... 370/389 |
| 2006/0101142 A1* | 5/2006 | Vasseur et al. ............... 709/225 |
| 2007/0053359 A1* | 3/2007 | Wu et al. ...................... 370/392 |
| 2008/0049621 A1* | 2/2008 | McGuire et al. ........... 370/236.2 |
| 2008/0221988 A1* | 9/2008 | Bappu et al. .................... 705/14 |
| 2009/0059920 A1* | 3/2009 | Guan ............................ 370/389 |
| 2009/0074404 A1* | 3/2009 | Suryaputra et al. ............... 398/5 |
| 2009/0116837 A1* | 5/2009 | Boertjes et al. ................. 398/58 |
| 2009/0190469 A1* | 7/2009 | Kimura et al. ................ 370/225 |
| 2009/0202240 A1 | 8/2009 | Carroll et al. |
| 2009/0225777 A1* | 9/2009 | Dong et al. ................... 370/468 |
| 2009/0324222 A1 | 12/2009 | Kunjidhapatham et al. |
| 2010/0021161 A1* | 1/2010 | Endo et al. ...................... 398/45 |
| 2010/0329155 A1* | 12/2010 | Kang ............................ 370/256 |
| 2011/0052190 A1 | 3/2011 | Lu et al. |
| 2011/0085795 A1* | 4/2011 | Ozaki ............................. 398/25 |
| 2011/0262128 A1 | 10/2011 | Madrahalli et al. |
| 2011/0274117 A1* | 11/2011 | Zhang et al. ................. 370/401 |
| 2011/0274427 A1 | 11/2011 | Madrahalli et al. |
| 2011/0302027 A1* | 12/2011 | Dibirdi et al. .............. 705/14.49 |
| 2012/0051745 A1 | 3/2012 | Srinivasan et al. |
| 2012/0106948 A1 | 5/2012 | Moynihan et al. |
| 2012/0257894 A1* | 10/2012 | Sarashina et al. ............... 398/58 |
| 2012/0294611 A1* | 11/2012 | Adler et al. ..................... 398/45 |

OTHER PUBLICATIONS

Request for Comments: 4202, Routing Extensions in Support of Generalized Multi-Protocol Label Switching (GMPLS).*

ITU-T G.709/Y.1331 discloses "Series G: Transmission Systems and Media, Digital Systems and Networks, Digital terminal equipments—General Series Y: Global Information Infrastructure, Internet Protocol Aspects and Next-Generation Networks Internet protocol aspects—Transport, Interfaces for the optical transport network" (Title).*

Chang et al; Dynamic Update of Aggregated Routing Information for Hierarchical QoS Routing in ATM Networks; Parallel and Distributed Systems; 2001, ICPads 2001, p. 653+.

CCAMP Working Group; Traffic Engineering Extensions to OSPF for Generalized MPLS (GMPLS) Control of Evolving G.709 OTN Networks—Internet Draft—draft-ceccarelli-ccamp-gmpls-cepf-g709-07; Abstract; Sep. 6, 2011.

* cited by examiner

BANDWIDTH ADVERTISEMENT SYSTEMS AND METHODS FOR OPTICAL TRANSPORT NETWORK

FIELD OF THE INVENTION

Generally, the field of art of the present disclosure pertains to optical networking systems and methods, and more particularly, to bandwidth advertisement systems and methods for Optical Transport Network (OTN)-based networks utilizing optical control planes.

BACKGROUND OF THE INVENTION

Optical networks and the like are deploying control plane systems and methods that span multiple layers (e.g., wavelength division multiplex (WDM), Synchronous Optical Network (SONET), Synchronous Digital Hierarchy (SDH), Optical Transport Network (OTN), Ethernet, and the like). Control plane systems and methods provide automatic allocation of network resources in an end-to-end manner. Exemplary control planes may include Automatically Switched Optical Network (ASON) as defined in G.8080/Y.1304, Architecture for the automatically switched optical network (ASON) (February 2005), the contents of which are herein incorporated by reference; Generalized Multi-Protocol Label Switching (GMPLS) Architecture as defined in Request for Comments (RFC): 3945 (October 2004) and the like, the contents of which are herein incorporated by reference; Optical Signaling and Routing Protocol (OSRP) from Ciena Corporation which is an optical signaling and routing protocol similar to PNNI (Private Network-to-Network Interface) and MPLS; or any other type control plane for controlling network elements at multiple layers, and establishing connections there between. Control plane systems and methods use bandwidth advertisements to notify peer nodes of available link capacity. The bandwidth advertisements exchange information over a dedicated and well known communication channel with peers on opposite ends of the communication link.

With respect to GMPLS, for example, Internet Engineering Task Force (IETF) Open Shortest Path First (OSPF) extensions for GMPLS define how bandwidth is advertised, i.e. "Traffic Engineering Extensions to OSPF for Generalized MPLS (GMPLS) Control of Evolving G.709 OTN Networks," (September 2011), available online at tools.ietf.org/html/draft-ceccarelli-ccamp-gmpls-ospf-g709-07, the contents of which are incorporated by reference herein. The OTN strategy taken by the IETF is straight forward in that the Interface Switching Capability Descriptor (ISCD) indicates the available bandwidth for each individual container size. For example, an aggregated link of 4×Optical channel Transport Unit 3 (OTU3) interface with no label switched paths (LSPs) or subnetwork connections (SNCs) provisioned would advertise: Optical channel Data Unit 0 (ODU0): 128 (4×32), ODU1: 64 (4×16), ODU2: 16 (4×4), and ODU3: 4 (4×1). An Optical channel Data Unit flex (ODUFlex) is advertised as a separate value. An ISCD is sent whenever the available bandwidth changes on a link. Conventional bandwidth advertisement systems and methods including ISCDs introduce a scaling problem for large network domains and large links. For example, in state of the art OTN networks, dense wave division multiplexing (DWDM) links are typically 40 Gbps OTU3, and migrating to 100 Gbps OTU4. Customer traffic on such links is expected to include a large number of ODU0, ODU1, and ODU2 LSPs carrying Gigabit Ethernet (GbE), 10 GbE, and legacy Synchronous Optical Network (SONET)/Synchronous Digital Hierarchy (SDH). ISCD messaging can become expensive to process during network restoration or reconfiguration as the available bandwidth of the link changes.

A conventional solution can include only advertising supported ODUk rates, i.e. advertise maximum supported capacity rather than advertising actual capacity. In this case, no update would be transmitted until the interface becomes incapable supporting a given ODUk rate. Using the 4×OTU3 aggregated link example from above, the starting bandwidth would simply be: {ODU0, ODU1, ODU2, ODU3}. If for example, a single ODU0 is taken on each line, a new message is transmitted advertising: {ODU0, ODU1, ODU2}. Continued use of ODU0 resources does not result in a further ISCD update until only 3 ODU0s remain on a line, at which point the advertised bandwidth becomes: {ODU0, ODU1}. This conventional solution is very efficient with respect to messaging, but it fails to address the case of an aggregated LSP utilizing multiple ODUk tributaries (due to the fact the actual number of available tributaries is not known by the control plane). Control planes are looking to support co-routed LSPs where a single client service is composed of N×GbE or N×10 GbE aggregated links, and the aforementioned conventional bandwidth advertisement solution is not an acceptable solution with such aggregated links.

BRIEF SUMMARY OF THE INVENTION

In an exemplary embodiment, a bandwidth advertisement update method in an optical network includes defining a plurality of bandwidth update threshold values for a plurality of bandwidth units supported on a link in the optical network, wherein the plurality of bandwidth update threshold values are managed independently relative to one another, and wherein the plurality of bandwidth units have different sizes; responsive to a change in available bandwidth on the link, sending a bandwidth advertisement if the available bandwidth for any of the plurality of bandwidth units is less than the associated bandwidth update threshold value; and responsive to a change in available bandwidth on the link, withholding the bandwidth advertisement if the available bandwidth for all of the plurality of bandwidth units is greater than or equal to the associated bandwidth update threshold value. The bandwidth advertisement update method can further include operating a control plane in the optical network; and utilizing the plurality of bandwidth update threshold values to reduce a number of bandwidth advertisements while supporting aggregated links in the control plane and bandwidth advertisements associated with the aggregated links. The aggregated links can include a co-routed subnetwork connection including a plurality of physical lines. The control plane can include Generalized Multi-Protocol Label Switching (GMPLS), and wherein the bandwidth advertisement update method can be operated in compliance with Interface Switching Capability Descriptor (ISCD) messaging associated with GMPLS. The control plane can include Automatically Switched Optical Network (ASON).

The bandwidth advertisement update method can further include setting the bandwidth update threshold value for one of the plurality of bandwidth units to zero to block provisioning of connections associated with the one of the plurality of bandwidth units on the link. The bandwidth advertisement update method can further include setting the bandwidth update threshold value for one of the plurality of bandwidth units to a maximum value supported by the link to enable sending the bandwidth advertisement for any change in bandwidth on the link. The plurality of bandwidth units can include Optical Transport Network (OTN) bandwidth units. The Optical Transport Network (OTN) bandwidth units can include Optical channel Data Unit level k (ODUk) units. The bandwidth advertisement update method can further include initially advertising the bandwidth advertisement as the bandwidth update threshold value for each of a plurality of bandwidth units when no traffic is provisioned on the link.

In another exemplary embodiment, an optical network includes a first node connected to a second node via a link, wherein the link supports a plurality of bandwidth units thereon; and a control plane operating between the first node and the second node; and wherein the first node is configured to provide bandwidth advertisement updates to other nodes based upon actual bandwidth for each of the plurality of bandwidth units on the link while constraining the bandwidth advertisement updates based upon a bandwidth update threshold value for each of the plurality of bandwidth units, wherein each of the bandwidth update threshold values are managed independently relative to one another, and wherein the plurality of bandwidth units have different sizes. The link can include an aggregated link including a plurality of physical lines treated as a single link by the control plane. Responsive to a change in available bandwidth on the link, the first node can be configured to send a bandwidth advertisement if the available bandwidth for any of the plurality of bandwidth units is less than the associated bandwidth update threshold update value; and, responsive to a change in available bandwidth on the link, the first node can be configured to withhold the bandwidth advertisement if the available bandwidth for all of the plurality of bandwidth units is greater than or equal to the associated bandwidth update threshold update value. The control plane can include Generalized Multi-Protocol Label Switching (GMPLS), and wherein the bandwidth advertisement update method can be operated in compliance with Interface Switching Capability Descriptor (ISCD) messaging associated with GMPLS. The plurality of bandwidth units can include Optical Transport Network (OTN) bandwidth units. The Optical Transport Network (OTN) bandwidth units can include Optical channel Data Unit level k (ODUk) units.

In yet another exemplary embodiment, a controller includes an interface communicatively coupled to at least one node in a network and to a least one port forming a link in the network; a processor; memory storing instructions that, when executed, cause the processor to: define a plurality of bandwidth update threshold values for a plurality of bandwidth units supported on the link in an optical network, wherein the plurality of bandwidth update threshold values are managed independently relative to one another, and wherein the plurality of bandwidth units have different sizes; responsive to a change in available bandwidth on the link, send a bandwidth advertisement through the interface if the available bandwidth for any of the plurality of bandwidth units is less than the associated bandwidth update threshold value; and responsive to a change in available bandwidth on the link, withhold the bandwidth advertisement from the interface if the available bandwidth for all of the plurality of bandwidth units is greater than or equal to the bandwidth update threshold value. The instructions, when executed, can further cause the processor to: operate an optical control plane in the network; and utilize the bandwidth update threshold value to reduce a number of bandwidth advertisements while supporting aggregated links in the optical control plane and bandwidth advertisements associated with the aggregated links.

BRIEF DESCRIPTION OF THE DRAWING(S)

Exemplary and non-limiting embodiments of the present disclosure are illustrated and described herein with reference to various drawings, in which like reference numbers denote like method steps and/or system components, respectively, and in which.

DETAILED DESCRIPTION OF THE INVENTION

In various exemplary embodiments, the present disclosure relates to bandwidth advertisement threshold systems and methods for OTN-based networks utilizing control planes. The bandwidth advertisement threshold systems and methods provide a configurable mechanism for bandwidth updates in the control plane providing flexibility and reducing bandwidth advertisements in the control plane while concurrently supporting aggregated connections. The threshold systems and methods utilize a Bandwidth Update Threshold which sets a maximum number of bandwidth units advertised for a link, and therefore the maximum co-routed SNC size supported by the link. It also serves as a bandwidth unit ceiling, over which no bandwidth updates are sent. Advantageously, the threshold systems and methods reduces the number of bandwidth advertisement messages thereby improving scalability, yet still provides a mechanism for supporting aggregated co-routed SNCs; allows tailoring of bandwidth advertisements to block certain types of traffic, e.g. setting an update_threshold[k]=0; provides the aforementioned improvements while complying with the emerging IETF standard referenced above for GMPLS and External Network-Network Interface (ENNI) interoperation.

Figure 1:
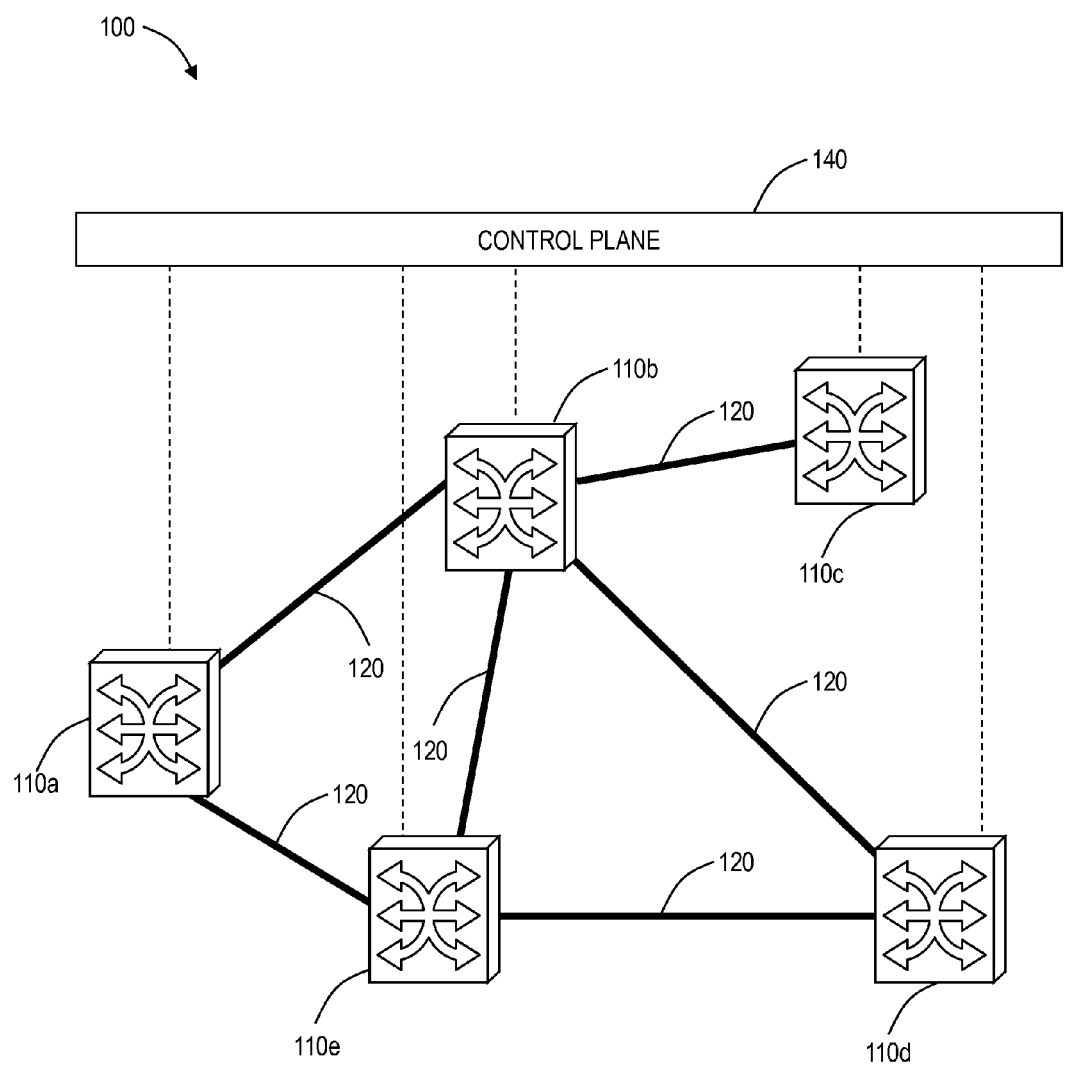
FIG. 1 is a network diagram of an exemplary network with five interconnected nodes.
Figure 8:
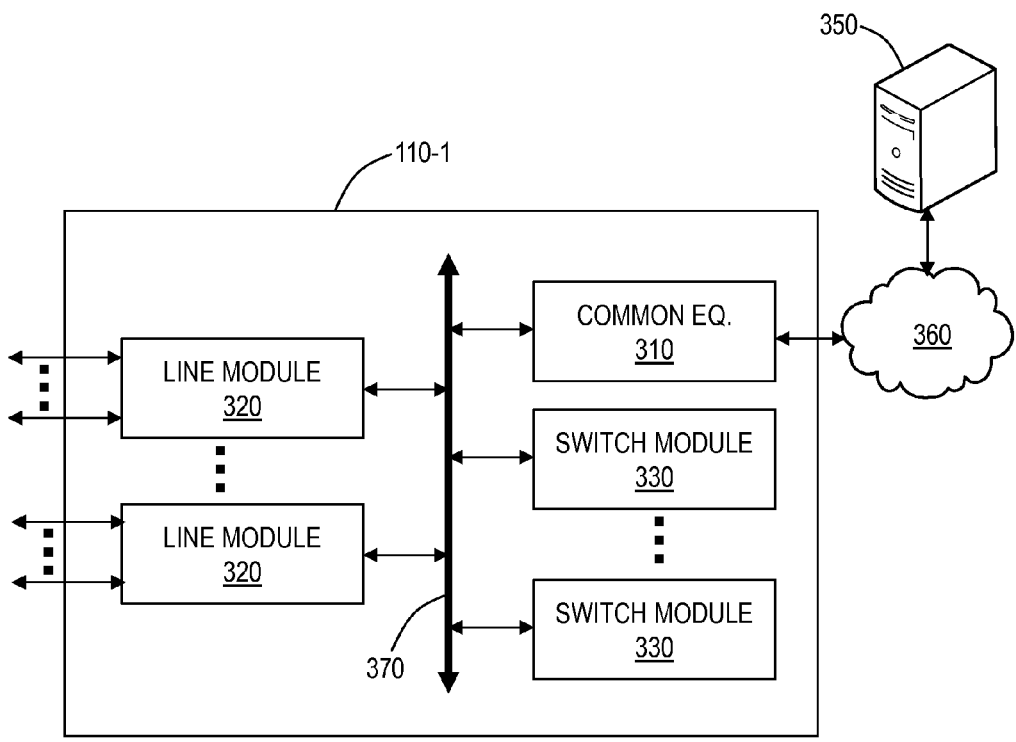
FIG. 8 is a block diagram of an exemplary node for the bandwidth advertisement systems and methods.

Referring to FIG. 1, in an exemplary embodiment, a network diagram illustrates an exemplary network 100 with five interconnected nodes 110a, 110b, 110c, 110d, 110e. The nodes 110 are interconnected through a plurality of links 120. In an exemplary embodiment, the nodes 110 communicate with one another over the links 120 through OTN. The nodes 110 can be network elements which include a plurality of ingress and egress ports forming the links 120. Generally, the nodes 110 are optical switches supporting OTN and other protocols. An exemplary node 110-1 is illustrated in FIG. 8. The network 100 includes a connection 130 with ingress/ egress at the nodes 110*a*, 110*c* and intermediate nodes 110*b*, 110*e*. Each of the various links 120 can support a set amount of bandwidth, i.e. a certain number for each {ODU0, ODU1, ODU2, ODU3}, and this amount of bandwidth is determined by the overall link bandwidth size and provisioned capacity on the link. The network 100 can include a control plane 140 operating on and/or between the nodes 110*a*, 110*b*, 110*c*, 110*d*. The control plane 140 includes software, processes, algorithms, etc. that control configurable features of the network 100, such as automating discovery of the nodes 110, capacity on the links 120, port availability on the nodes 110, connectivity between ports; dissemination of topology and bandwidth information between the nodes 110; calculation and creation of paths for connections; network level protection and restoration; and the like.

In an exemplary embodiment, the control plane 140 can utilize ASON, GMPLS, Resource Reservation Protocol (RSVP), OSRP, etc. Those of ordinary skill in the art will recognize the network 100 and the control plane 140 can utilize any type control plane for controlling the nodes 110 and establishing connections there between. The bandwidth advertisement threshold systems and methods can be implemented with and/or by the control plane or implemented separately. In various exemplary embodiments, the bandwidth advertisement threshold systems and methods provide a mechanism to reduce the amount of bandwidth advertisements for each of the links 120 between the nodes 110. Concurrently, the bandwidth advertisement threshold systems and methods are supportive of aggregated links in the network 100.

Figure 2:
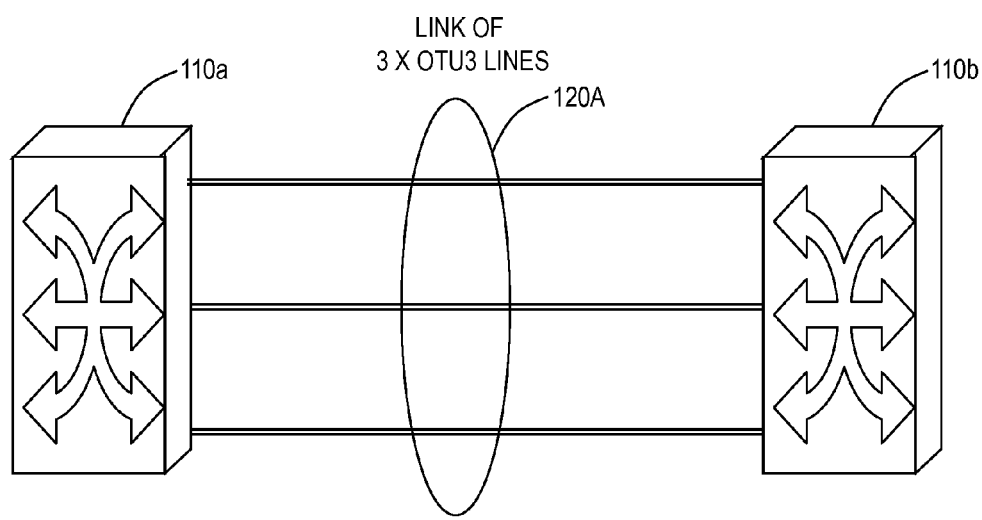
FIG. 2 is a network diagram of a link on the network of FIG. 1 showing a co-routed subnetwork connection (SNC) link between the nodes.

Referring to FIG. 2, in an exemplary embodiment, a network diagram illustrates a link 120A on the network 100 showing a co-routed SNC link 120A between the nodes 110*a*, 110*b*. The co-routed SNC link 120A is an aggregated link that includes multiple SNCs (or LSPs, note as described herein, SNCs and LSPs are interchangeable). In the example of FIG. 2, the co-routed SNC link 120A is a link of 3×OTU3 lines, i.e. 120 Gbps of capacity. The co-routed SNC link 120A includes multiple ODUk path members are co-routed as a single SNC, the members are co-routed on common links, and the member SNCs have "shared fate" if any members fail, all members restore. Exemplary applications for the co-routed SNC link 120A include transport of layer 2/3 services where minimum differential packet delay is important, network designs where it is desirable that a given group of SNCs share risk, transport of virtually concatenated clients (VCAT) where minimizing differential delay between VCAT members is important (this is usually due to de-skew limitations of client equipment), and any application where a common latency must be guaranteed for a group of SNCs.

From a terminology perspective, the links 120, 120A are virtual objects used by the control plane 140 and the network 100 for routing thereon. A line is a physical object. For example, the link 120A includes three physical lines of OTU3. These three physical lines can be three different 40 Gbps wavelengths physically connected between the nodes 110*a*, 110*b* and not necessarily over the same physical fiber path. That is, the control plane virtualizes the underlying physical resources for management thereof. The bandwidth advertisement threshold systems and methods described herein are focused on the advertisements of the control plane of the link 120, 120A bandwidth. In various exemplary embodiments, the bandwidth advertisement threshold systems and methods are described with reference to aggregated link such as the co-routed SNC link 120A. Of note, aggregated links are one use of the bandwidth advertisement threshold systems and methods, and those of ordinary skill in the art will recognize the bandwidth advertisement threshold systems and methods can apply equally to non-aggregated links as well.

Figure 3:
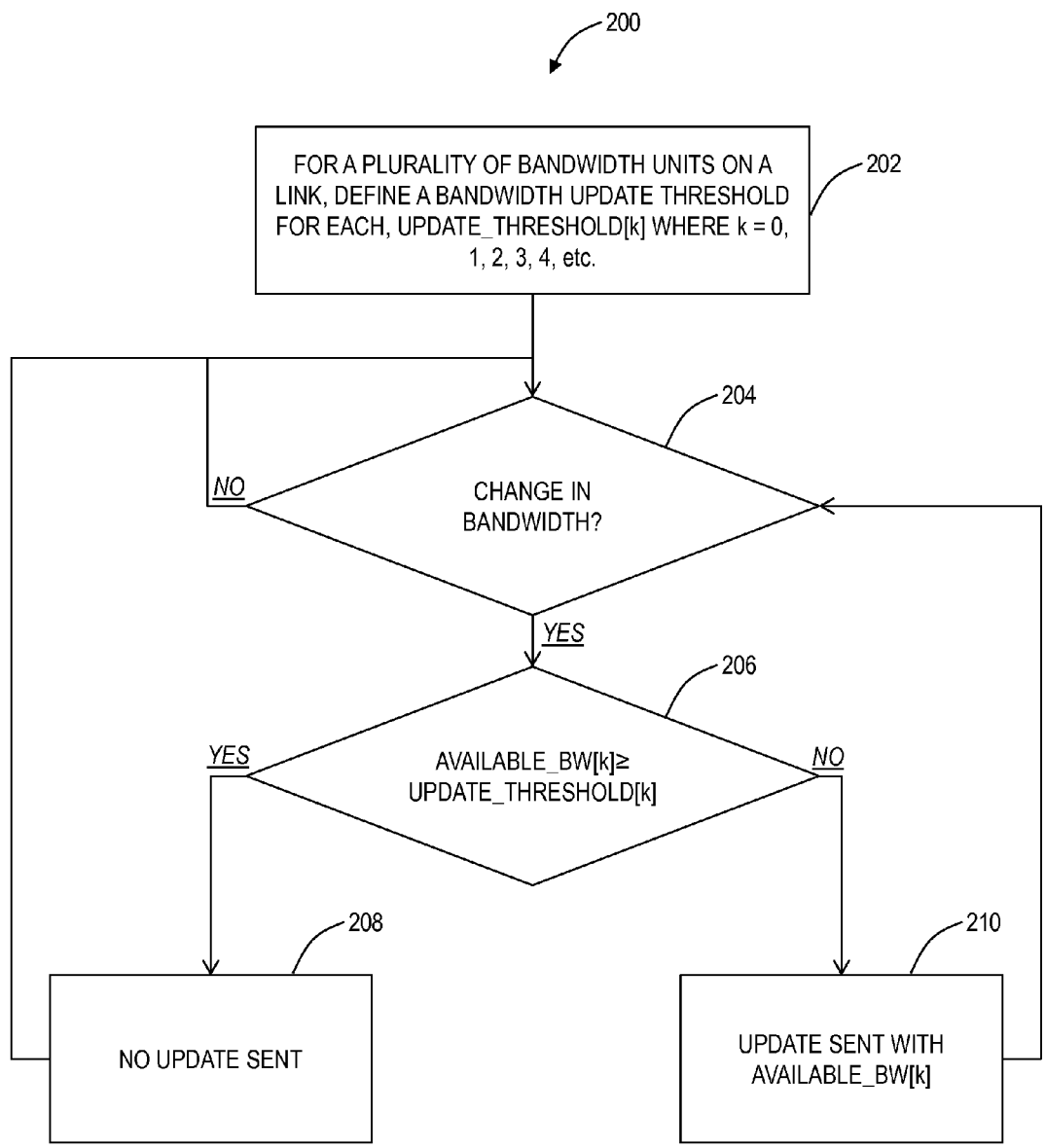
FIG. 3 is a flowchart of a bandwidth advertisement update method providing a configurable mechanism for bandwidth updates in the network of FIG. 1.

Referring to FIG. 3, in an exemplary embodiment, a flowchart illustrates a bandwidth advertisement update method 200 providing a configurable mechanism for bandwidth updates. The method 200 contemplates use, for example, with the nodes 110 and the links 120, 120A. The method 200 can be implemented by the nodes 110 on associated components contained therein, and the method 200 is implemented on a per link 120 level in the network 100. Specifically, the method 200 is described herein relative to a single link 120, and those of ordinary skill in the art will recognize this can be performed for each link 120 in the network 100 (or in another network). Further, with respect to aggregated links such as the co-routed SNC link 120A, the method 200 is implemented using the aggregate bandwidth in the aggregated links such as the co-routed SNC link 120A. The method 200 includes, for a plurality of bandwidth units on a link, define a bandwidth update threshold for each, update_threshold[k] where k=0, 1, 2, 3, 4, etc. (step 202). The bandwidth update threshold sets the maximum number of bandwidth units advertised for a link, and therefore the maximum co-routed SNC size supported by the link. The bandwidth update threshold also serves as a bandwidth unit ceiling, over which no bandwidth updates are sent.

The bandwidth update threshold can be a variable that is stored in software and/or hardware. Further, the bandwidth update threshold can be set at a default value that is modifiable by a network operator. The bandwidth update threshold can be viewed as a 1×N matrix (or N×1 matrix) where N is the number of bandwidth units. Each value in the 1N matrix is representative of the bandwidth update threshold for that particular bandwidth unit. In OTN, bandwidth units can be ODU0, ODU1, ODU2, ODU3, and ODU4. Note, these bandwidth units are about 1.25 Gbps for ODU0, about 2.5 Gbps for ODU1, about 10 Gbps for ODU2, about 40 Gbps for ODU3, and about 100 Gbps for ODU4. Of course, the 1×N matrix can be expanded to include new bandwidth units that may develop such as ODU5, ODU6, etc. ODUflex units can also be supported in the 1×N matrix, and are described in further detail herein. In an exemplary embodiment, the bandwidth update threshold, update_threshold[k], value determines the maximum integer number of ODUk Tributary Ports advertised for a link (k=0, 1, 2, 3, 4).

In this exemplary embodiment for OTN, the bandwidth update threshold, update_threshold[k], has the following format:

ODU0: update_threshold[0]
ODU1: update_threshold[1]
ODU2: update_threshold[2]
ODU3: update_threshold[3]
ODU4: update_threshold[4]

The bandwidth update thresholds are configurable on each link 120 through the nodes 110 and the control plane 140. In an exemplary embodiment, the update_threshold[k] is a Control Plane Link managed object. Each ODUk update_threshold[k] parameter has a global default value on the NE, and in step 202, the network operator can change the default value or leave it as is. Note, the network operator can also change the values in the update_threshold[k] as needed.

Conversely with the update_threshold[k], there can be a variable for available bandwidth units, available_bw[k], that is a similar structure as the update_threshold[k], but which values are indicative of the actual available bandwidth for each of the bandwidth units on the link 120. The actual available bandwidth, available_bw[k], has the following format:

ODU0: available_bw[0]
ODU1: available_bw[1]
ODU2: available_bw[2]
ODU3: available_bw[3]
ODU4: available_bw[4]

Once set, the method 200 monitors for changes in bandwidth on the link 120 associated with the implementation of the method 200 (step 204). If there is a change in bandwidth, the update_threshold[k] serves as a restriction on whether or not to send a bandwidth advertisement update in the control plane 140. As noted herein, a conventional ISCD is sent whenever there is an update. The update_threshold[k] seeks to reduce the amount of bandwidth updates while simultaneously supporting multiple bandwidth units over aggregated links. Responsive to a change in bandwidth (step 206), the method 200 checks if available_bw[k] is greater than or equal to update_threshold[k] for each element in the 1×N matrix, i.e. available_bw[0] is compared to update_threshold[0], available_bw[1] is compared to update_threshold[1], etc. That is, the comparison is performed at the same bandwidth unit for the actual available bandwidth and the bandwidth update_threshold. For each k where available_bw[k]≥update_threshold[k], no bandwidth update is sent (step 208). For each k where available_bw[k]<update_threshold[k], a bandwidth update is sent for the particular k with the updated bandwidth value being advertised as the value of available_bw[k] (step 210). Thus, this behavior is applied at each ODUk (k=0, 1, 2, 3, 4) independently.

The bandwidth update threshold value determines the maximum supported co-routed SNC size that can be supported by a link 120. For example: update_threshold[2]=4; implies that 4×ODU2 co-routed SNC can be supported. Selection of the bandwidth update threshold value tailors the advertisement behavior to in the following ways. For update_threshold[k]=0, the method 200 advertises zero bandwidth for ODUk and this setting of zero prevents routing on the link for the ODUk rate, i.e. a setting of zero blocks the particular bandwidth unit from the link 120. For update_threshold[k]=1, the method minimizes the number of advertisement messages, advertising a single ODUk, and only sends a bandwidth advertisement update when the available bandwidth for the ODUk goes to zero. Note, links with this setting cannot support ODUk co-routed SNCs.

For update_threshold[k]=N, the method 200 advertises N×ODUk and bandwidth updates are sent only when the available bandwidth becomes <N. Links with this setting can support co-routed SNCs up to size N. For update_threshold[k]=MAX, where MAX is equal to or greater than the number of bandwidth units supported by the link, the method 200 advertises the total available ODUk bandwidth and updates are sent whenever the available bandwidth changes. Note, this setting of MAX enables conventional behavior as described herein with the ISCD. Thus, the method 200 is flexible and configurable enabling standard advertisement behavior based on setting update_threshold[k]=MAX.

In the foregoing, reference is made to OTN with the method 200. However, those of ordinary skill in the art will recognize the method 200 can equally apply to other protocols with distinct bandwidth units and advertisements associated therewith. For example, the method 200 can operate with SONET and/or SDH as well and control planes associated therewith. In SONET, for example, the update_threshold[k] and available_bw[k] can be for k=1, 3, 12, 48, 192 (i.e., Synchronous Transport Signal-1 (STS-1), STS-3, STS-12, STS-48, and STS-192). Conversely for SDH, the update_threshold[k] and available_bw[k] can be for k=1, 4, 16, 64, 256 (i.e. Synchronous Transport Module level-1 (STM-1, STM-4, STM-16, STM-64, and STM-256). Of course, other increments are also contemplated for the bandwidth units in the update_threshold[k] and available_bw[k], as well as other protocols.

The method 200 enables setting a plurality of bandwidth update threshold values for a plurality of bandwidth units supported on a link in the optical network. Advantageously, the method 200 enables the plurality of bandwidth update threshold values to be managed independent of one another. This is advantageous, for example, with respect to OTN where there is not a direct correlation between bandwidth units, i.e. ODU0, ODU1, ODU2, ODU3, ODU4, etc., in terms of a smallest common constituent building block. Note, in SONET, for example, different bandwidth units are just larger versions of smaller bandwidth units with the same constituent building block being an STS-1 (or an STM-1 in SDH). That is, larger bandwidth units just have more STS-1s than smaller sized bandwidth units. This is not the case in OTN where it is important to manage the bandwidth update threshold for each bandwidth unit independently. Put differently, the method 200 contemplates the different bandwidth units having variable sizes relative to other bandwidth units, and these sizes are not correlated. For example, in SONET/SDH, a single threshold can be used since any SONET/SDH signal is built from STS-1s/STM-1s. In SONET/SDH, because STS-1s/STM-1 s are a smallest common constituent building block, other bandwidth units are not advertised by definition. This is not the case in OTN where there is no constituent building block such as STS-1s that forms the basis for all larger signals. For example, an ODU4 can support 2 ODU3s, 10, ODU2s, 40 ODU1s, and 80 ODU0s, an ODU3 can support 4 ODU2s, 16 ODU1s, and 32 ODU0s, etc. From the foregoing, it can be seen that there is not one way to advertise capacity for ODUk signals. Thus, with OTN, the method 200 has to have a plurality of bandwidth update threshold values for a plurality of bandwidth units supported on the link, with the plurality of bandwidth update threshold values managed independently relative to one another, and with the plurality of bandwidth units having different sizes.

Figure 4A:
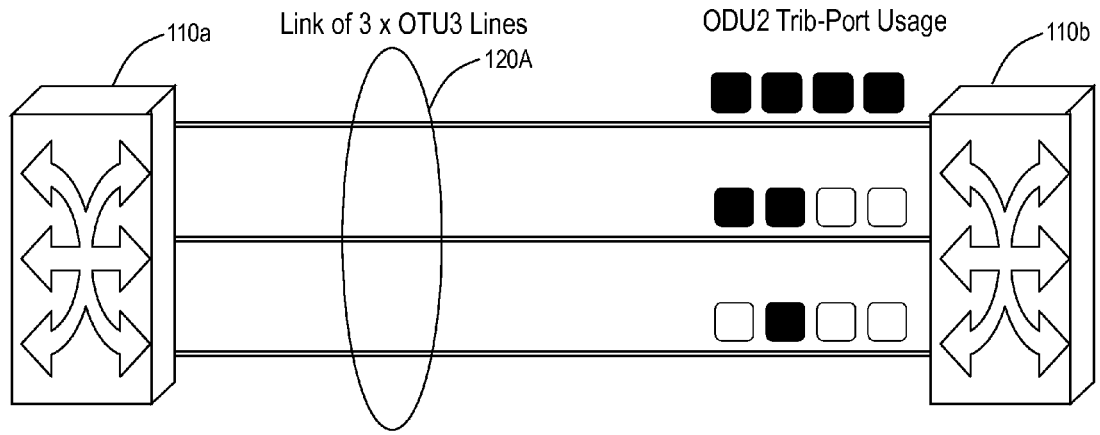
FIGS. 4A-4D are network diagrams of an exemplary operation of the method of FIG. 3 on the link of FIG. 2 between two nodes with an update_threshold[2] set to 4.
Figure 4B:
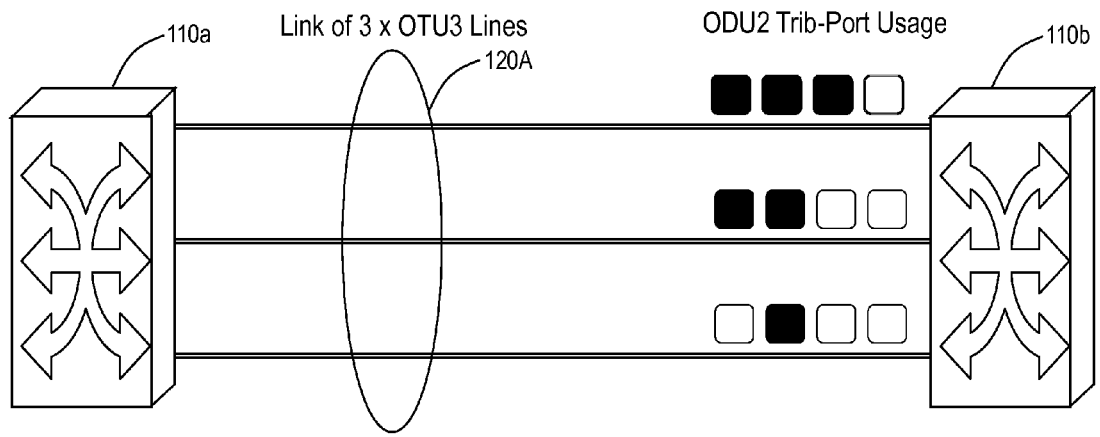
Figure 4C:
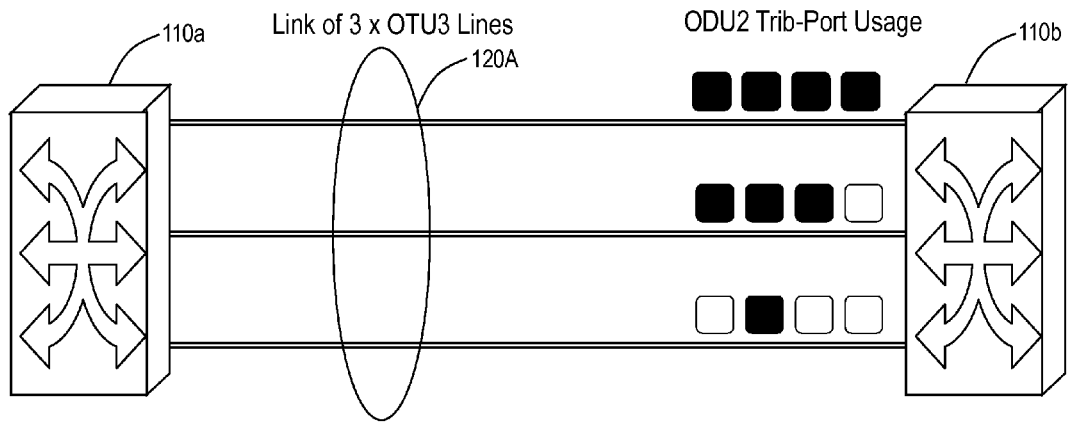
Figure 4D:
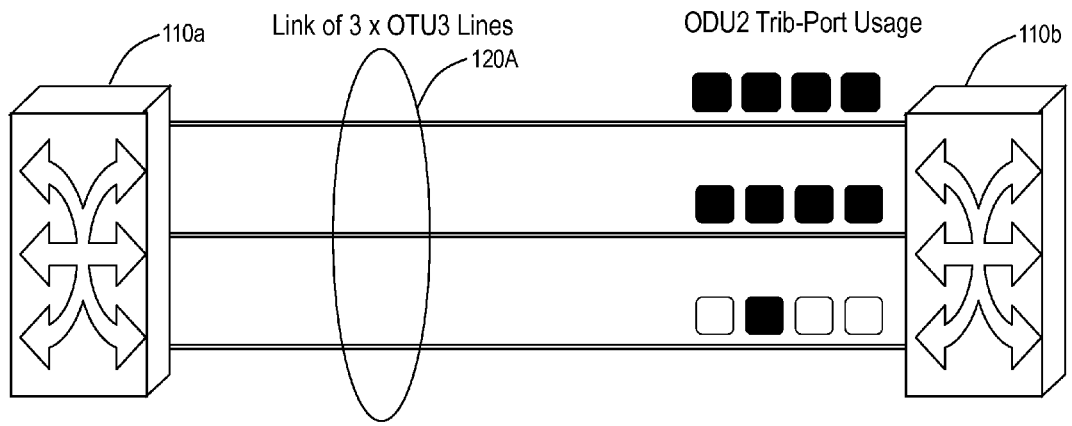

Referring to FIGS. 4A-4D, in an exemplary embodiment, network diagrams illustrate an exemplary operation of the method 200 on the link 120A between the nodes 110a, 110b. This exemplary operation focuses solely on ODU2 bandwidth updates with the update_threshold[2] set to 4. As described in FIG. 2, the link 120A is an aggregation of 3×OTU3 physical lines. Thus, the link 120A supports 12 ODU2 bandwidth units. In FIG. 4A, the link 120A has 7 provisioned ODU2s and 5 available ODU2s, thus no bandwidth advertisement update is sent since 5 available ODU2s is greater than or equal to the update_threshold[2] of 4. Note, the 7 provisioned ODU2s are denoted by the fully shaded boxes on the link 120A and the 5 available ODU2s are denoted by the white boxes on the link 120A. In FIG. 4B, the link 120A now has 6 provisioned ODU2s and 6 available ODU2s, thus no bandwidth advertisement update is sent since 6 available ODU2s is greater than or equal to the update_threshold[2] of 4. In FIG. 4C, the link 120A now has 8 provisioned ODU2s and 4 available ODU2s, thus no bandwidth advertisement update is sent since 4 available ODU2s is greater than or equal to the update_threshold[2] of 4. Finally, in FIG. 4D, the link now has 9 provisioned ODU2s and 3 available ODU2s, and the method 200 will send out a bandwidth advertisement update of ODU2 bandwidth equal to 3 since 3 available ODU2s is less than the update_threshold[2] of 4.

Figure 5A:
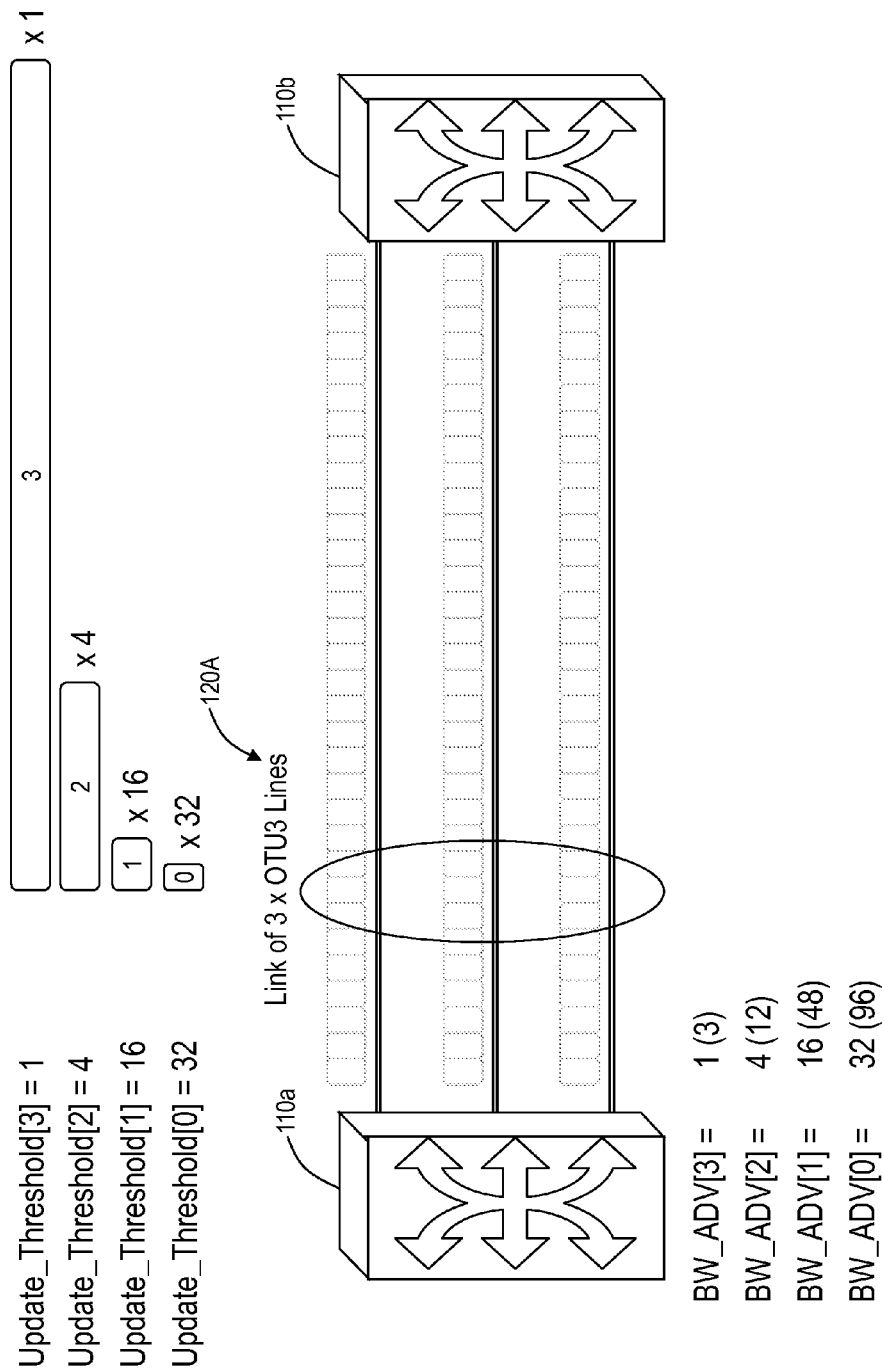
FIGS. 5A-5F are network diagrams of another exemplary operation of the method of FIG. 3 on the link of FIG. 2 between two nodes with an update_threshold[k] set to {1, 4, 16, 32}.

Referring to FIGS. 5A-5F, in an exemplary embodiment, network diagrams illustrate another exemplary operation of the method 120 on the link 120A. In particular, this exemplary operation in FIGS. 5A-5F focuses on bandwidth advertisements for update_threshold[k], k=0, 1, 2, and 3, whereas FIGS. 4A-4D focused on update_threshold[k], k=2. In this exemplary operation of FIGS. 5A-5F, the bandwidth update_threshold values are update_threshold[3]=1, update_threshold[2]=4, update_threshold[1]=16, and update_threshold[0]=32. The bandwidth advertised is denoted as BW_ADV[k]=advertised link bandwidth (actual link bandwidth). In FIG. 5A, initially, there is nothing provisioned on the link 120A. The advertised link bandwidth is sent out as {BW_ADV[3], BW_ADV[2], BW_ADV[1], BW_ADV[0]}={1, 4, 16, 32}. This means the nodes 110 each are told the link 120A can support 1 ODU3, 4 ODU2s, 16 ODU1s, and 32 ODU0s. Note, since the link 120A has no provisioned capacity, the actual available bandwidth, available_bw[k]={available_bw[3], available_bw[2], available_bw[1], available_bw[0]}, on the link 120A is {3 ODU3s, 12 ODU2s, 48 ODU1s, 96 ODU0s}, but the method 200 does not advertise this. Instead, the method advertises the values in the update_threshold[k] since available_bw[k]≥update_threshold[k].

Figure 5B:
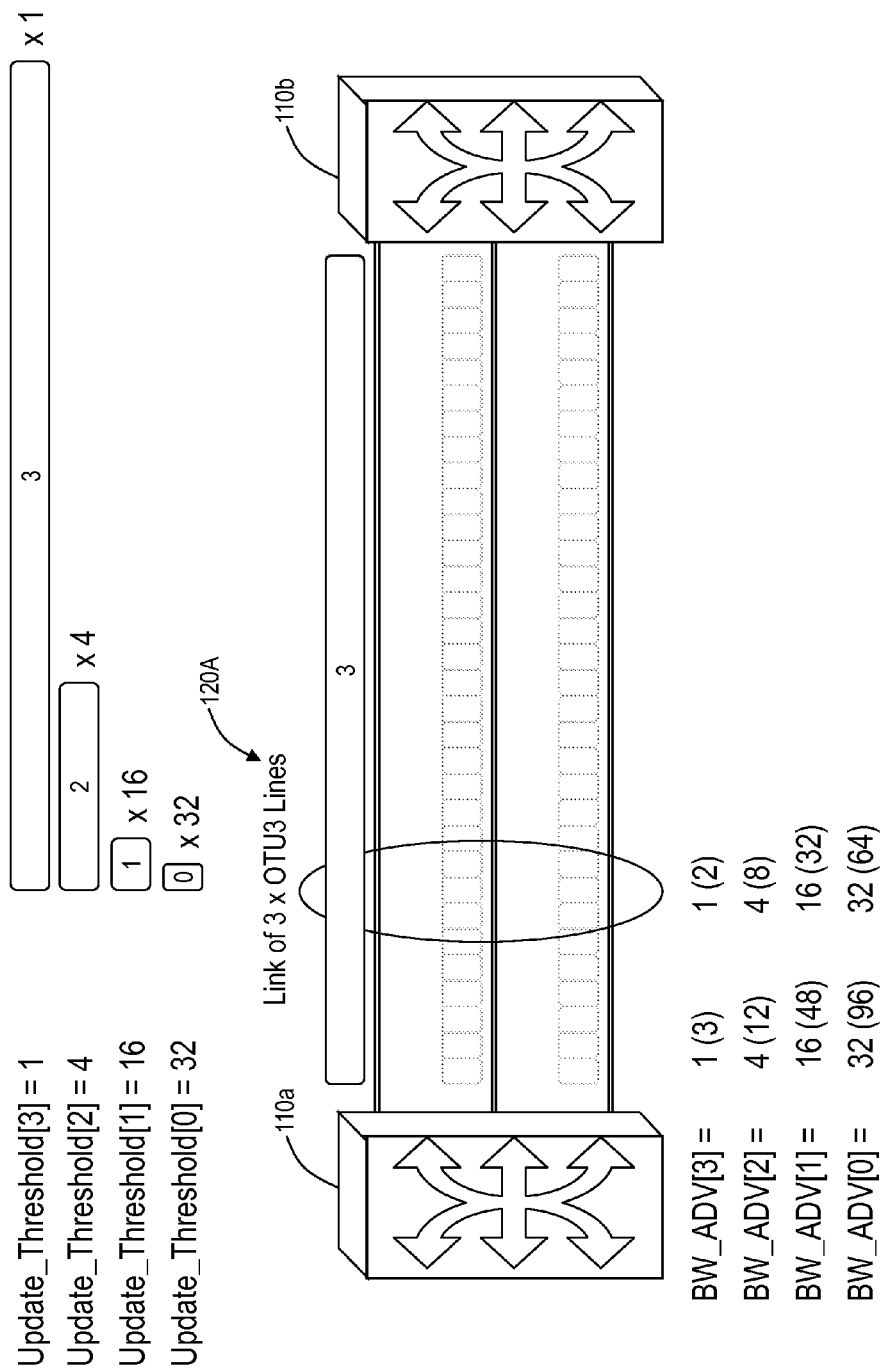
Figure 5C:
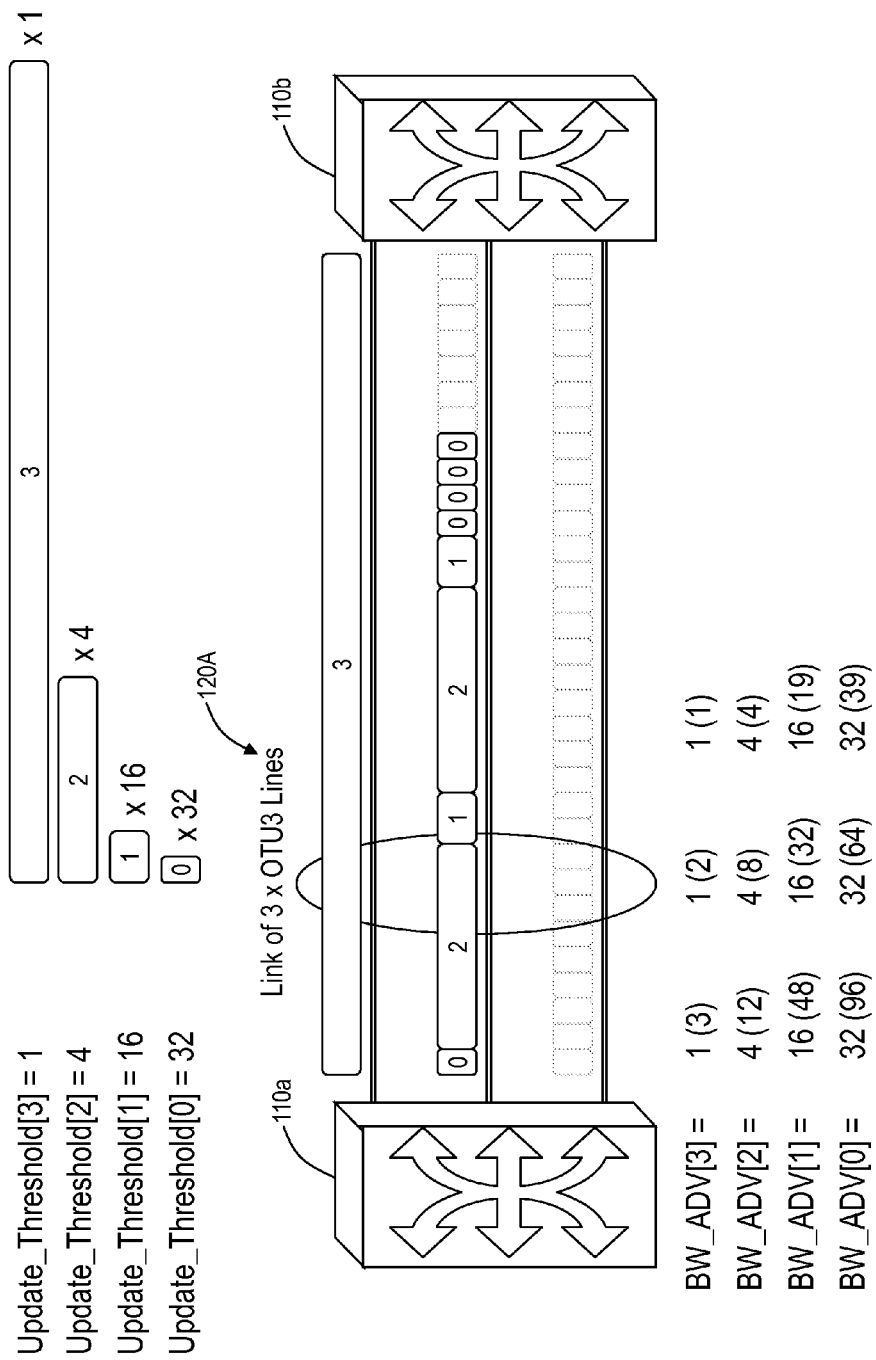
Figure 5D:
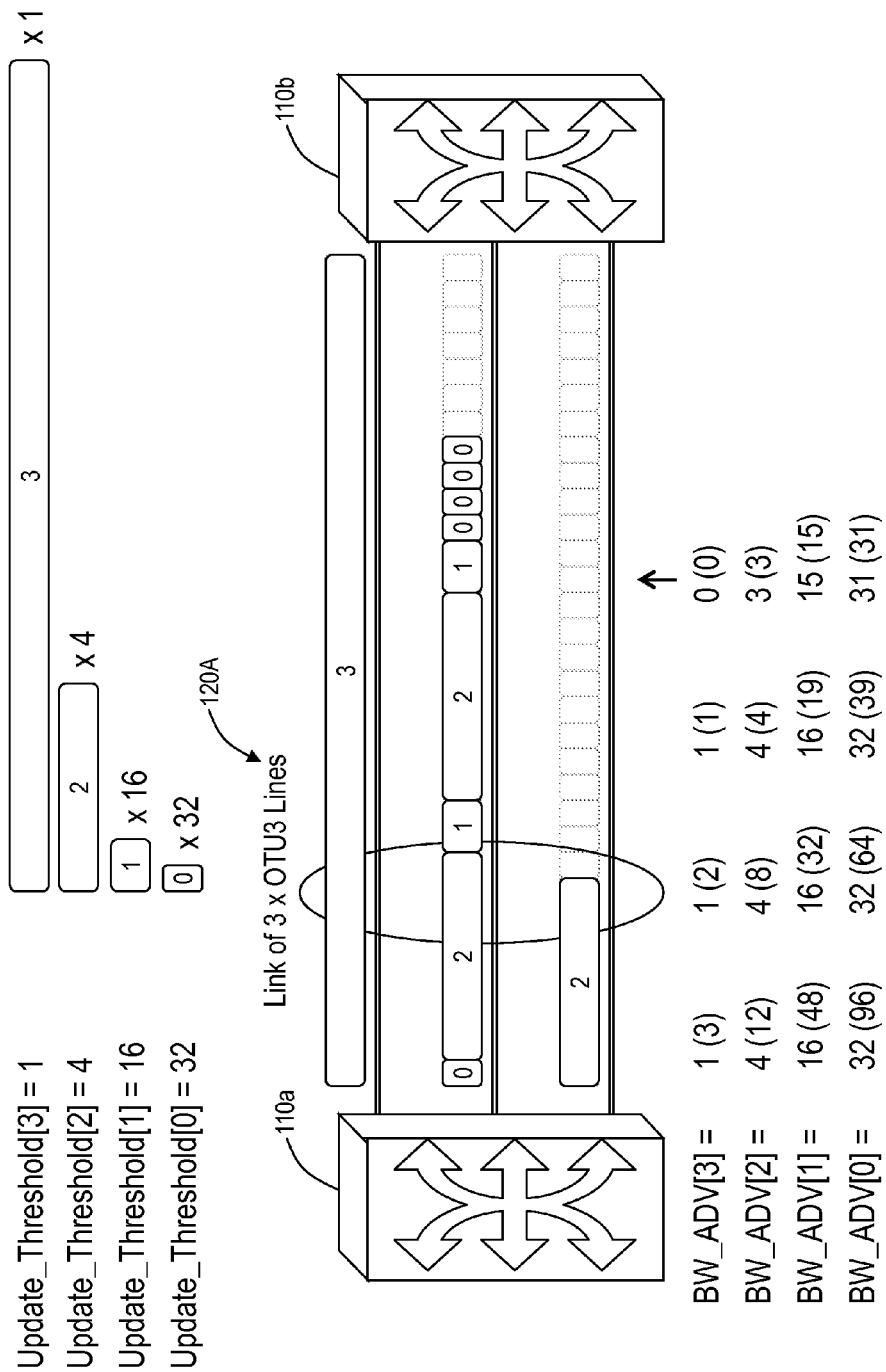

In FIG. 5B, an ODU3 is added to the link 120A. The actual available bandwidth, available_bw[k], now equals {2 ODU3s, 8 ODU2s, 32 ODU1s, 64 ODU0s}, but no updates are sent to BW_ADV[k] because available_bw[k]≥update_threshold[k] despite adding the ODU3. In FIG. 5C, 2×ODU2s, 2×ODU1s, and 5×ODU0s are added to the link 120A in addition to the ODU3 from FIG. 5B. The actual available bandwidth, available_bw[k], now equals {1 ODU3, 4 ODU2s, 19 ODU1s, 39 ODU0s}, but no updates are sent to BW_ADV[k] because available_bw[k]≥update_threshold[k] despite the additions in FIG. 5C. In FIG. 5D, an ODU2 is added to the link 120A in addition to the bandwidth added in FIGS. 5B-5C. The actual available bandwidth, available_bw[k], now equals {0 ODU3, 3 ODU2s, 15 ODU1s, 31 ODU0s}, and an update is sent to BW_ADV[k] because available_bw[k]<update_threshold[k]. The fact a bandwidth advertisement update is sent is denoted by the arrow in FIG. 5D. The advertised link bandwidth is sent out as {BW_ADV[3], BW_ADV[2], BW_ADV[1], BW_ADV[0]}={0, 3, 15, 31}.

Figure 5E:
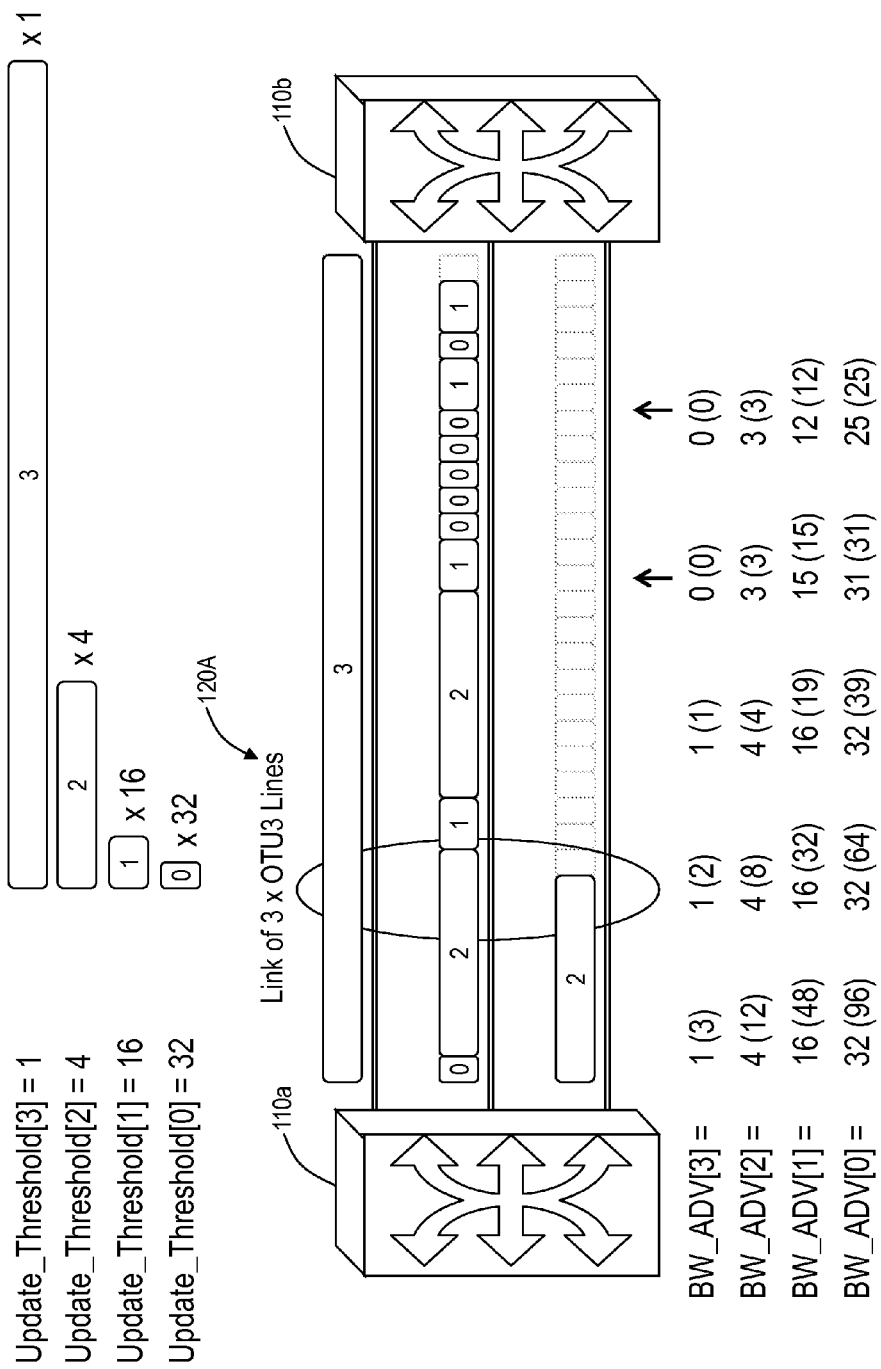
Figure 5F:
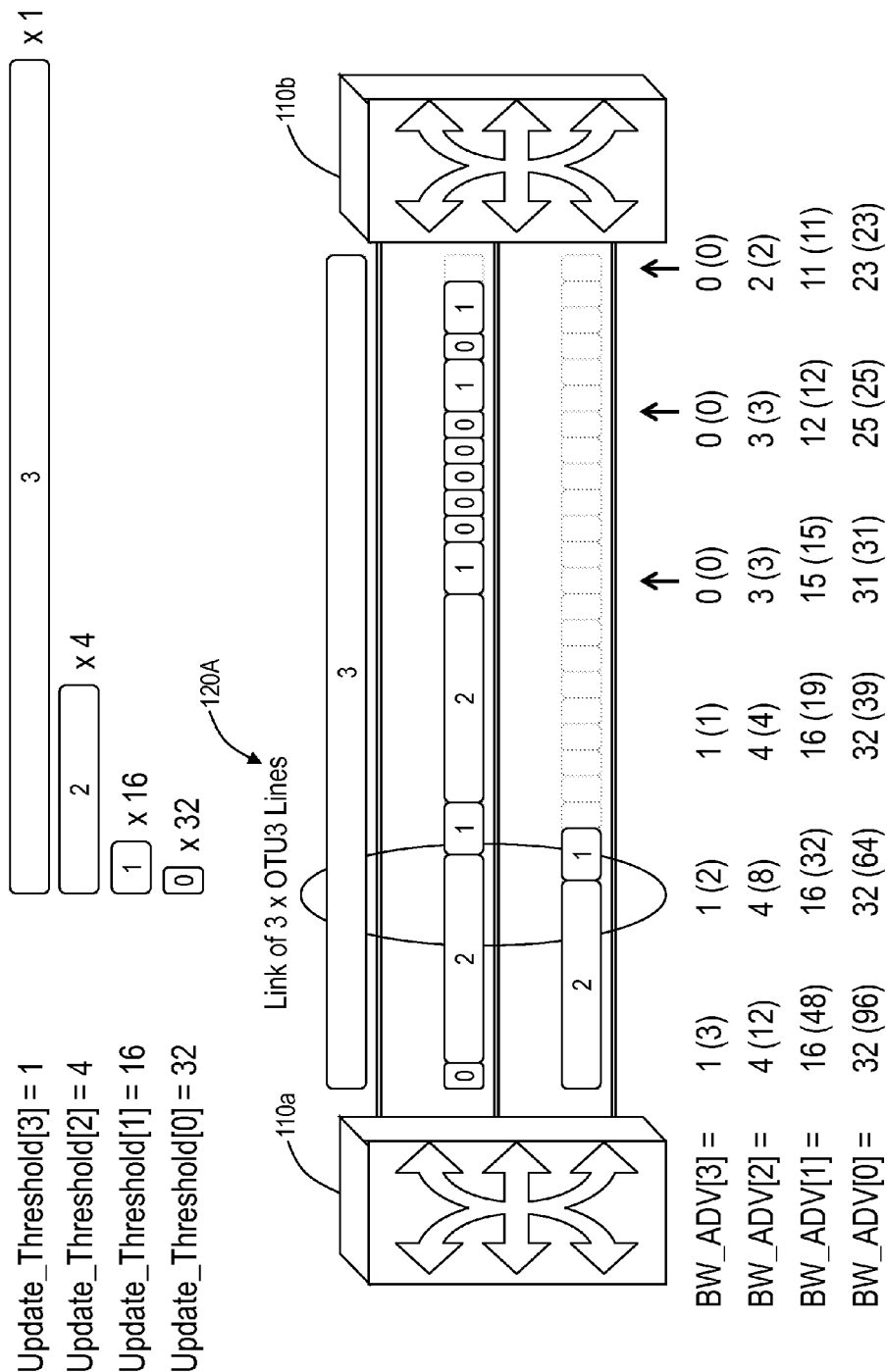

In FIG. 5E, two ODU1s and two ODU0s are added to the link 120A in addition to the bandwidth added in FIGS. 5B-5D. The actual available bandwidth, available_bw[k], now equals {0 ODU3, 3 ODU2s, 12 ODU1s, 25 ODU0s}. Note, available_bw[k]<update_threshold[k], so an advertisement update is sent is denoted by the arrow in FIG. 5E. The advertised link bandwidth is sent out as {BW_ADV[3], BW_ADV[2], BW_ADV[1], BW_ADV[0]}={0, 3, 12, 25}. Finally, in FIG. 5F, an ODU1 is added to the link 120A in addition to the bandwidth added in FIGS. 5B-5E. The actual available bandwidth, available_bw[k], now equals {0 ODU3, 2 ODU2s, 11 ODU1s, 23 ODU0s}. Note, available_bw[k]<update_threshold[k], so an advertisement update is sent is denoted by the arrow in FIG. 5F. The advertised link bandwidth is sent out as {BW_ADV[3], BW_ADV[2], BW_ADV[1], BW_ADV[0]}={0, 2, 11, 23}.

Figure 6A:
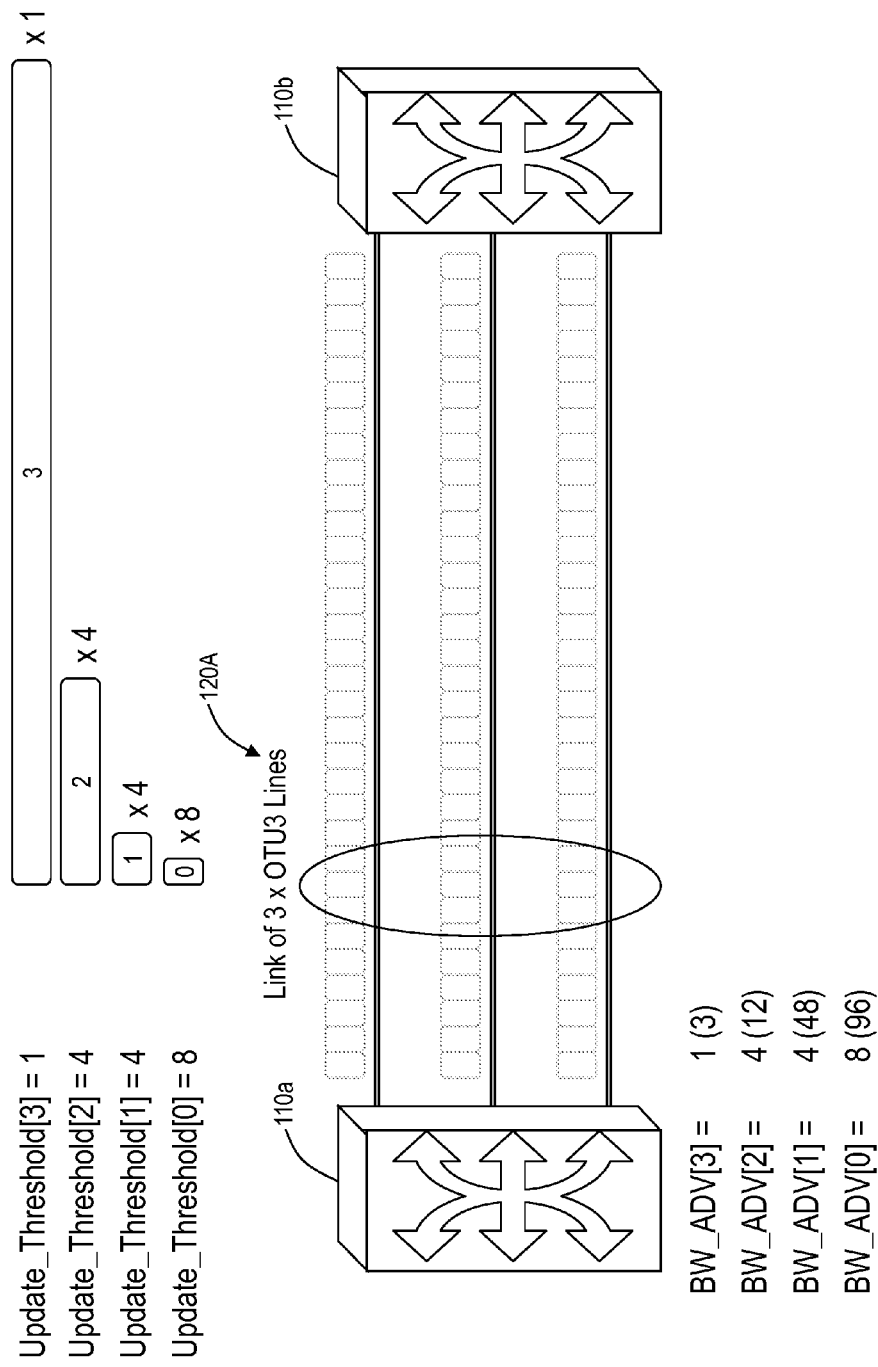
FIGS. 6A-6F are network diagrams of another exemplary operation of the method of FIG. 3 on the link of FIG. 2 between two nodes with an update_threshold[k] set to {1, 4, 4, 8}.
Figure 6B:
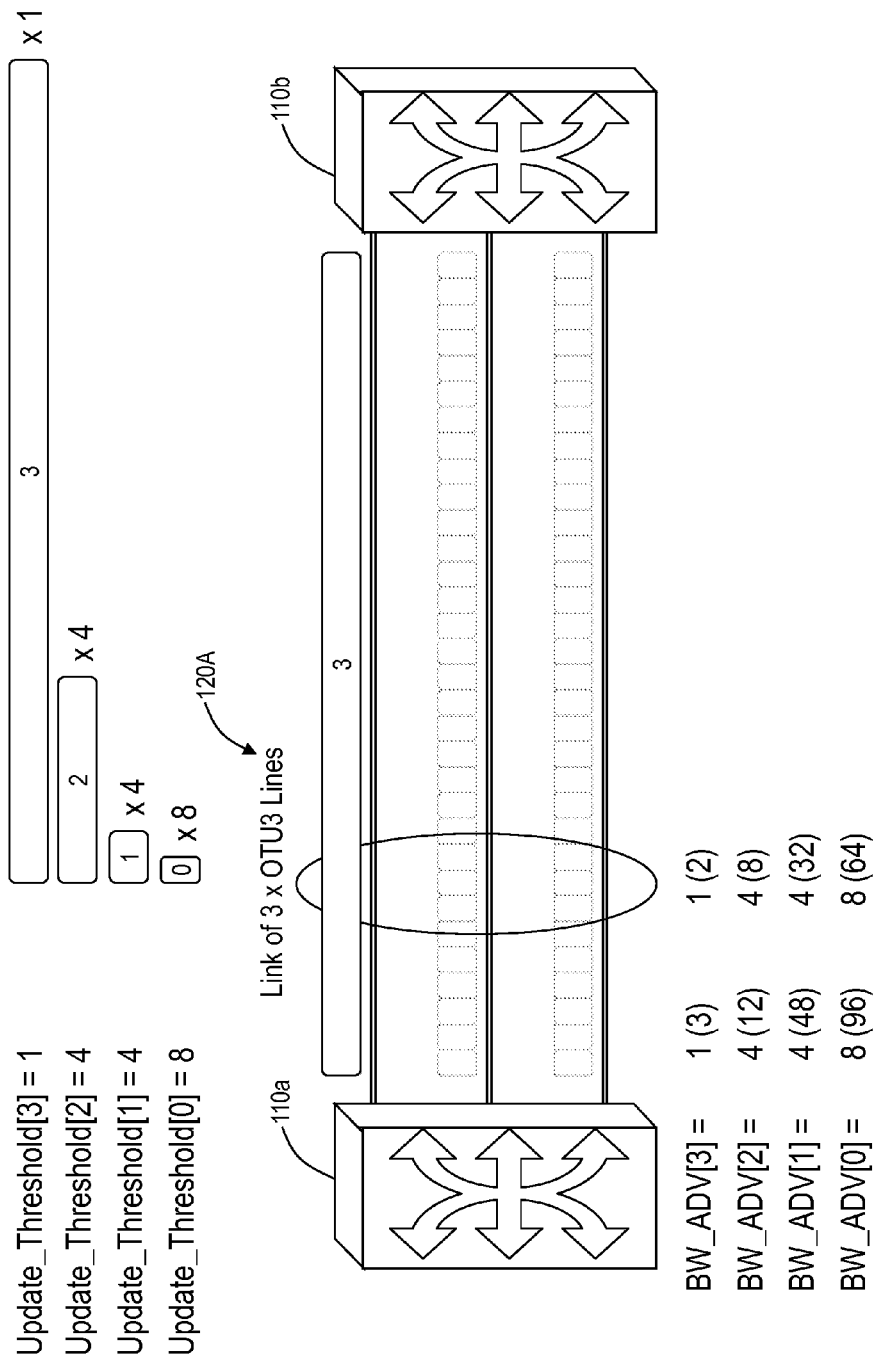
Figure 6C:
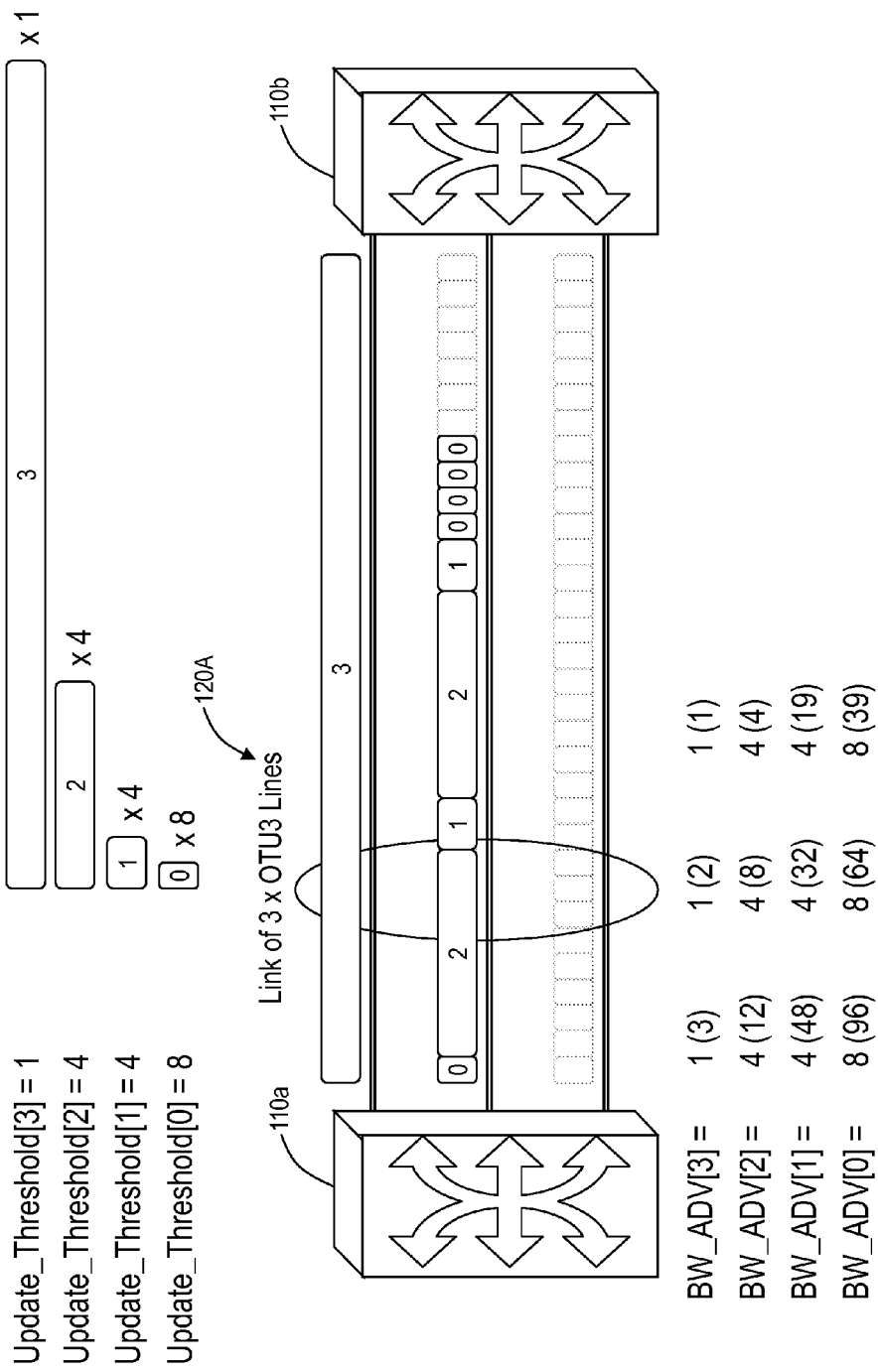

Referring to FIGS. 6A-6F, in an exemplary embodiment, network diagrams illustrate another exemplary operation of the method 120 on the link 120A. Similar to the exemplary operation of FIGS. 5A-5F, the exemplary operation in FIGS. 6A-6F focuses on bandwidth advertisements for update_threshold[k], k=0, 1, 2, and 3, but utilizes different values of update_threshold[k] of {1, 4, 4, 8}. In FIG. 6A, no bandwidth is provisioned on the link 120A, and the initial advertised link bandwidth is sent out as {BW_ADV[3], BW_ADV[2], BW_ADV[1], BW_ADV[0]}={1, 4, 4, 8}. Thus, with no provisioned bandwidth on a link such as initially upon turn up of the link, the initial advertised link bandwidth is the same as the update_threshold[k]. In FIG. 6B, an ODU3 is added to the link 120A. The actual available bandwidth, available_bw[k], now equals {2 ODU3s, 8 ODU2s, 32 ODU1s, 64 ODU0s}, but no updates are sent to BW_ADV[k] because available_bw[k]≥update_threshold[k] despite adding the ODU3. In FIG. 6C, 2×ODU2s, 2×ODU1s, and 5×ODU0s are added to the link 120A in addition to the ODU3 from FIG. 6B. The actual available bandwidth, available_bw[k], now equals {1 ODU3, 4 ODU2s, 19 ODU1s, 39 ODU0s}, but no updates are sent to BW_ADV[k] because available_bw[k]≥update_threshold[k] despite the additions in FIG. 6C.

Figure 6D:
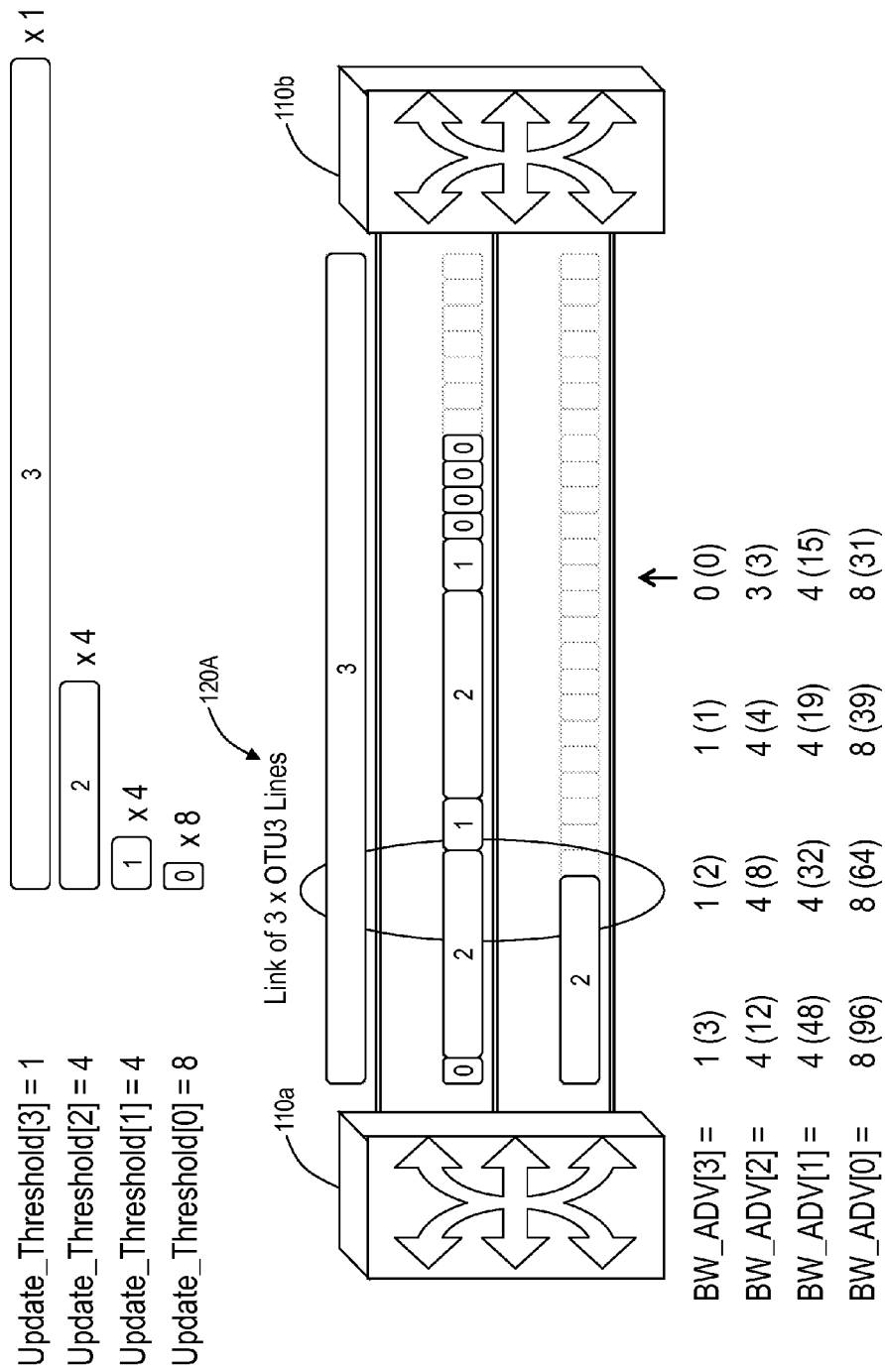
Figure 6E:
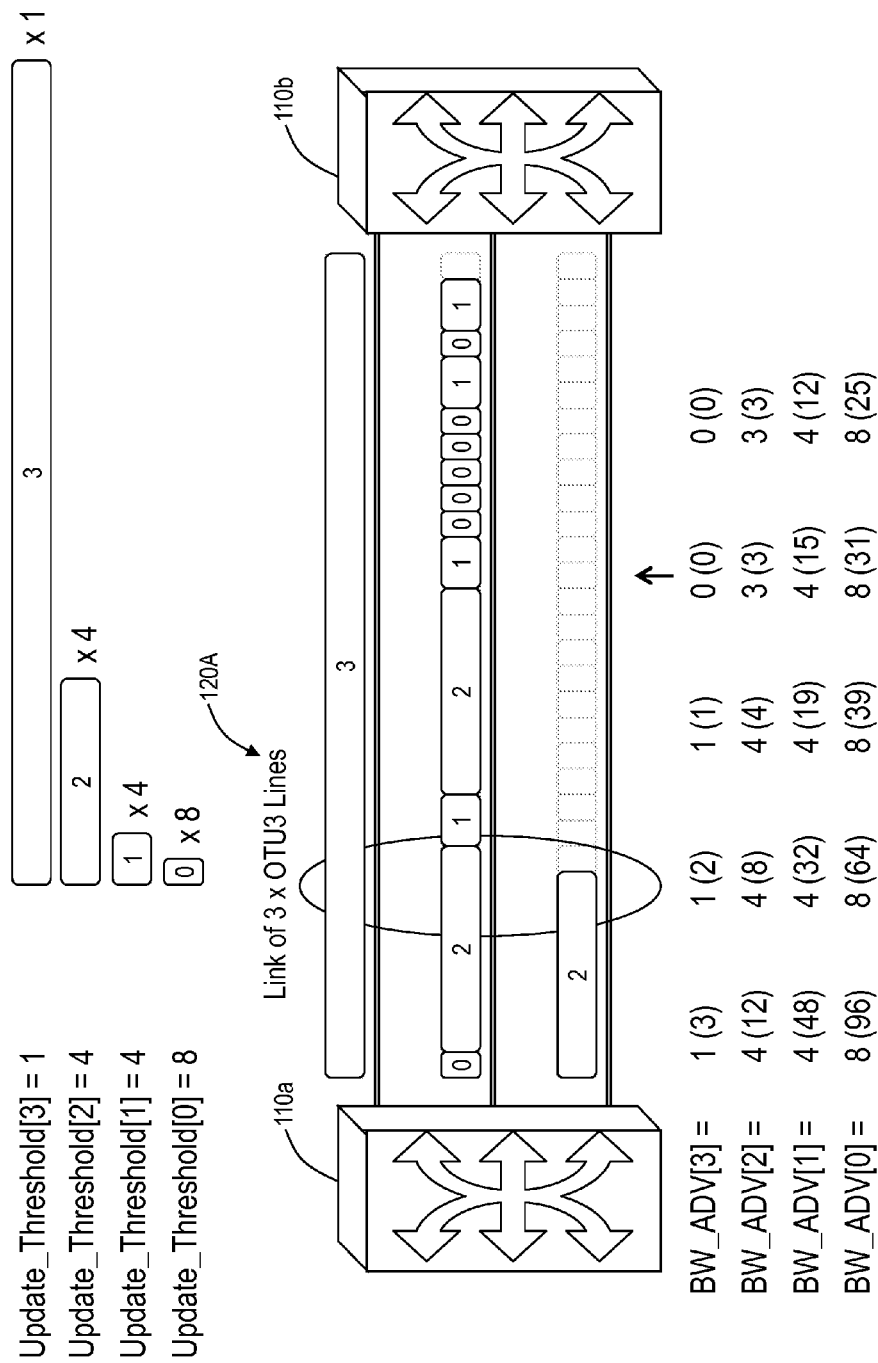
Figure 6F:
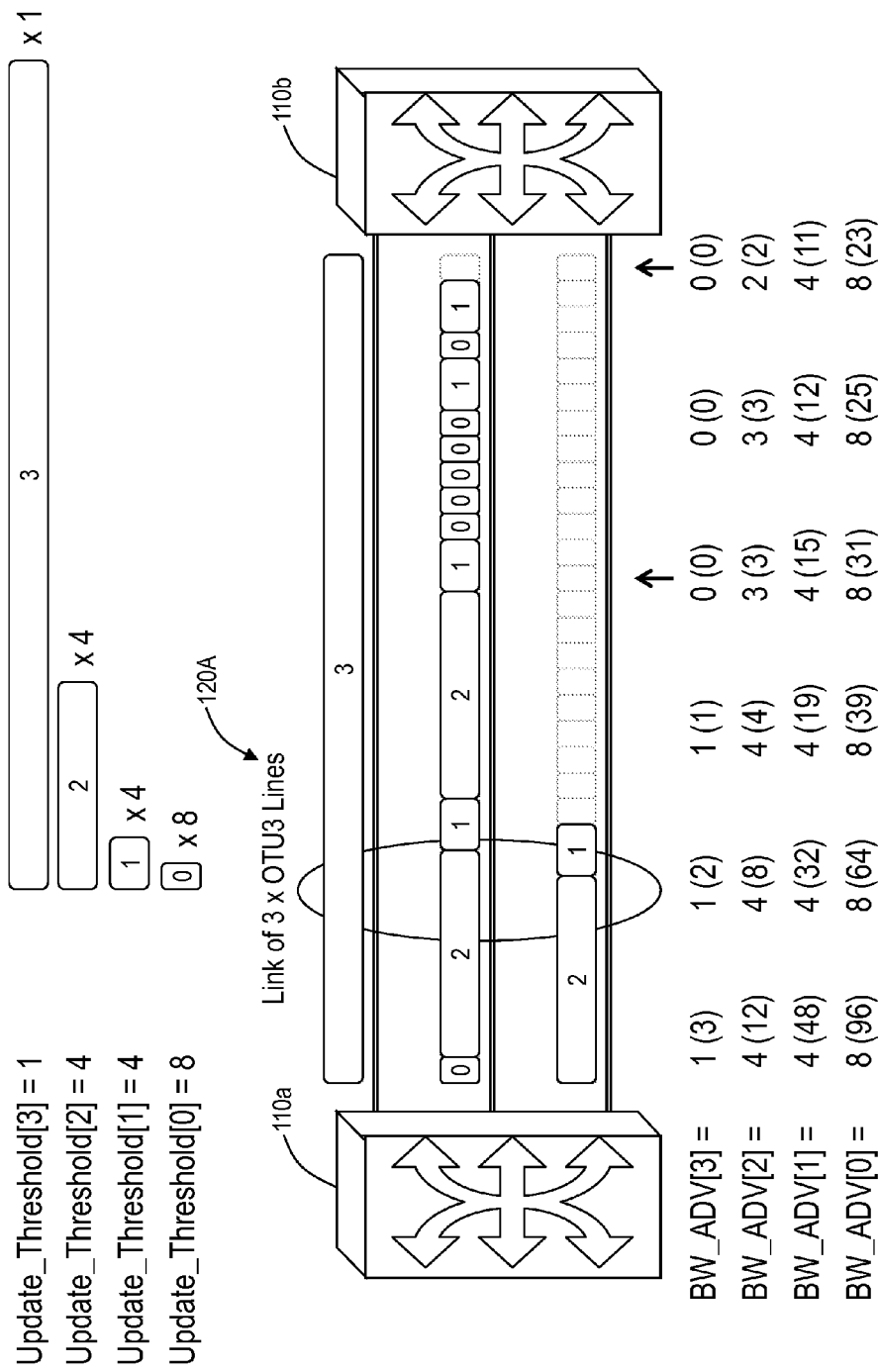

In FIG. 6D, an ODU2 is added to the link 120A in addition to the bandwidth added in FIGS. 6B-6C. The actual available bandwidth, available_bw[k], now equals {0 ODU3, 3 ODU2s, 15 ODU1s, 31 ODU0s}, and an update is sent to BW_ADV[k] because available_bw[k]<update_threshold[k]. The fact a bandwidth advertisement update is sent is denoted by the arrow in FIG. 6D. The advertised link bandwidth is sent out as {BW_ADV[3], BW_ADV[2], BW_ADV[1], BW_ADV[0]}={0, 3, 4, 8}. In FIG. 6E, two ODU1s and two ODU0s are added to the link 120A in addition to the bandwidth added in FIGS. 6B-6D. The actual available bandwidth, available_bw[k], now equals {0 ODU3, 3 ODU2s, 12 ODU1s, 25 ODU0s}. However, no new bandwidth advertisement is sent because the impacted units, ODU1 and ODU0, are still above the update threshold. Specifically, available_bw[1, 0]≥update_threshold[1, 0]. In FIG. 6F, an ODU1 is added to the link 120A. The actual available bandwidth, available_bw[k], now equals {0 ODU3, 2 ODU2s, 11 ODU1s, 23 ODU0s}. Note, available_bw[k]<update_threshold[k], so an advertisement update is sent is denoted by the arrow in FIG. 6E. The advertised link bandwidth is sent out as {BW_ADV[3], BW_ADV[2], BW_ADV[1], BW_ADV[0]}={0, 2, 4, 8}.

Figure 7A:
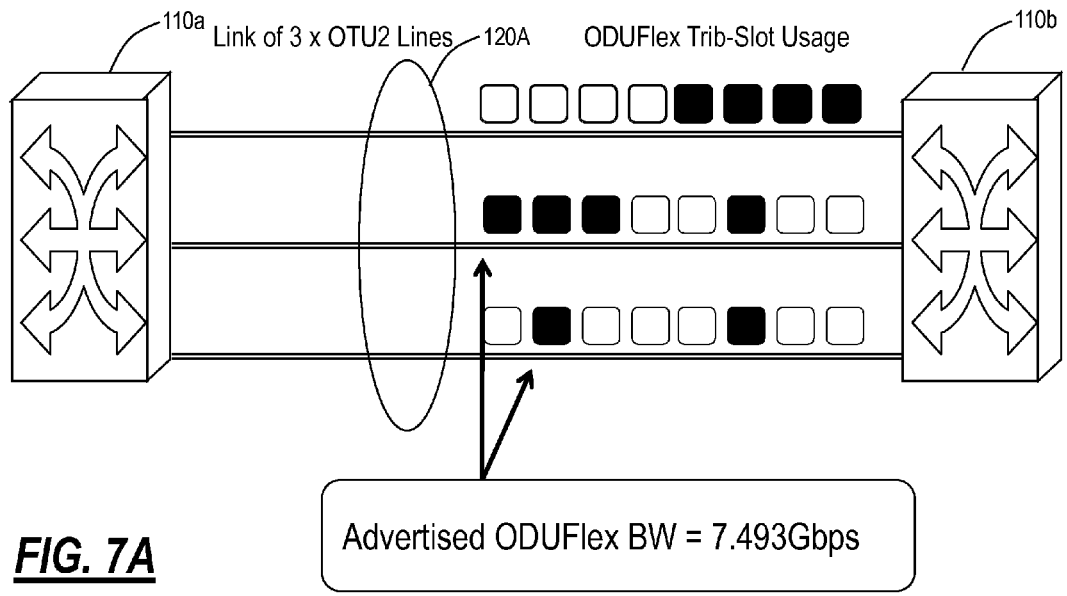
FIGS. 7A-7C are network diagrams illustrate an exemplary operation of bandwidth advertisements on the link of FIG. 2 between two nodes for ODUflex units.
Figure 7B:
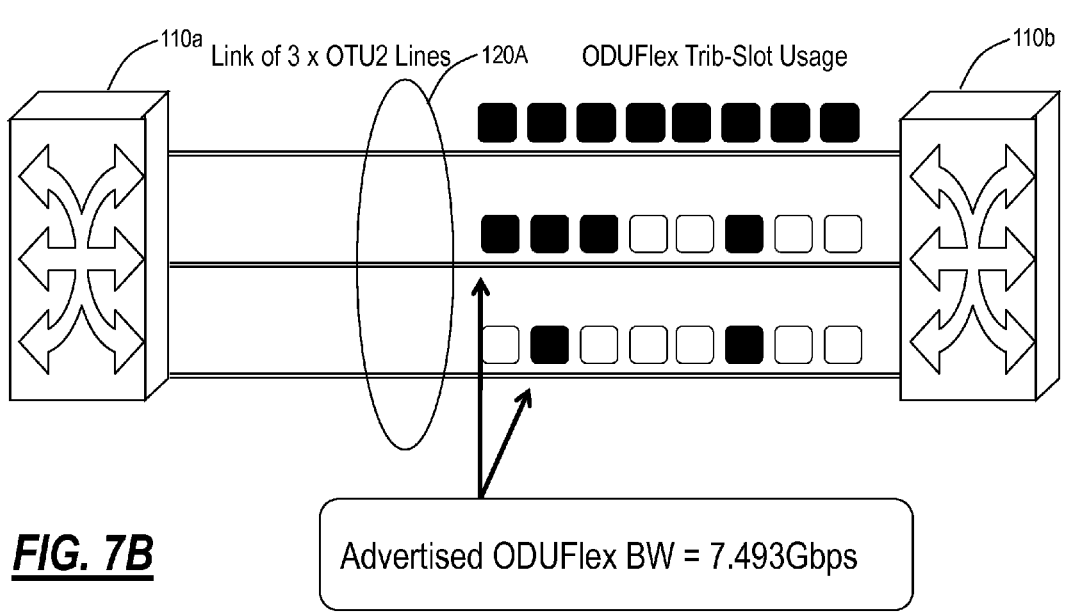
Figure 7C:
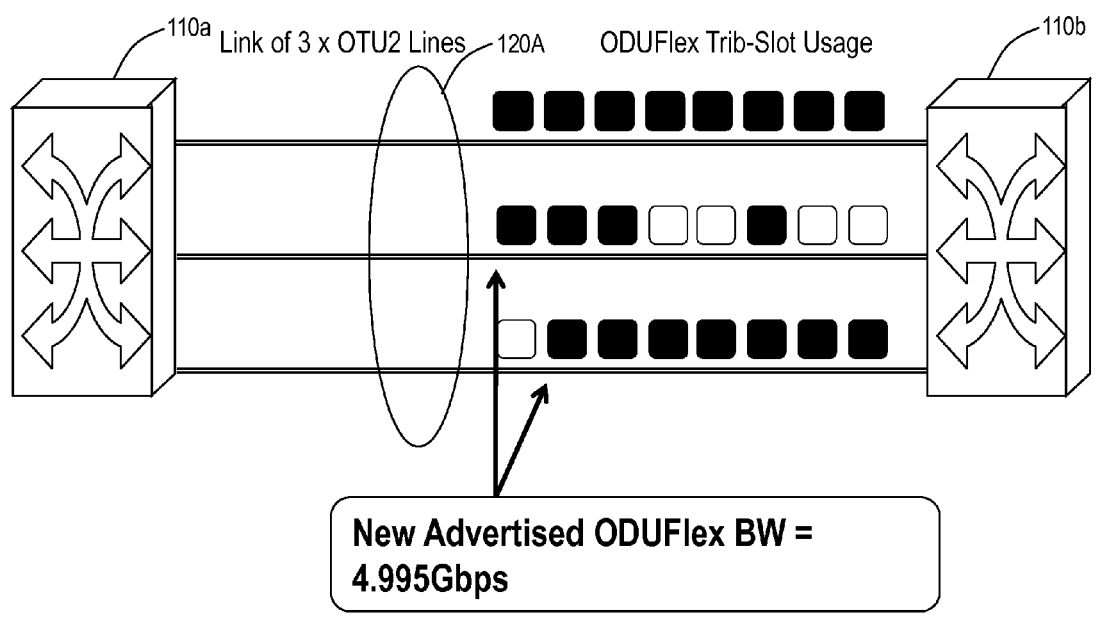

Referring to FIGS. 7A-7C, in an exemplary embodiment, network diagrams illustrate an exemplary operation of bandwidth advertisements on the link 120A between the nodes 110a, 110b for ODUflex units. ODUflex Bandwidth is advertised as the maximum size flex circuit that the link 120A can support. Unlike the bandwidth units in the method 120, the bandwidth is advertised as a rate (derived from tributary slots), and distinct from ODU0 tributary ports. Note, this rate can be advertised concurrently with the advertisements related to ODUk bandwidth units. However, the ODUflex bandwidth advertisements may not support bandwidth update thresholds and co-routed SNCs. The advertised ODUflex bandwidth is calculated using the number of tributary slots, the tributary slots rate, and the OPUk rate tolerance as follows:

$$\text{ODUFlex\_BW} = n(\text{ODTUk·ts\_Rate}) \times (1 - \text{OPUk\_Rate\_Tolerance})$$

(where n is the maximum number of tributary slots on a given line)

Note that ODTUk·ts_Rate differs depending on ODUk rate, for example, ODU2: 1.249G, n=1→8; ODU3: 1.254G, n=1→32; ODU4: 1.301G, n=1→80.

For constant bit rate (CBR) SNCs, the control plane 140 must add the CBR client rate tolerance (ex: 100 ppm) to the SNC. Since the advertised value is a rate, each node 110 must convert back to a number of Tributary Slot (n) for different OTUk line rates when setting up connections. From the previous equation for a given OTUk line:

$$n = \frac{ODUFlex\_BW}{(ODTUk.ts\_Rate) \times (1 - OPUk\_Rate\_Tolerance)}$$

FIG. 7A illustrates the link 120A with 24 ODUflex timeslots of which 10 are provisioned and 14 are available. The advertised ODUflex bandwidth is 7.493 Gbps which is for the 6 timeslots on the third OTU3 of the link 120A. FIG. 7B illustrates the link 120A with 4 additional ODUflex timeslots provisioned so as to have 14 provisioned and 10 available. However, the advertised ODUflex bandwidth is still 7.493 Gbps which is for the 6 timeslots on the third OTU3 of the link 120A. FIG. 7C illustrates the link 120A with 5 additional ODUflex timeslots provisioned. The advertised ODUflex bandwidth is now 4.995 Gbps based on the 4 available timeslots on the second OTU3 of the link 120A.

Referring to FIG. 8, in an exemplary embodiment, a block diagram illustrates an exemplary node 110-1 for the bandwidth advertisement systems and methods. In an exemplary embodiment, the exemplary node 110-1 can be a network element that may consolidate the functionality of a multi-service provisioning platform (MSPP), digital cross connect (DCS), Ethernet and/or Optical Transport Network (OTN) switch, dense wave division multiplexed (DWDM) platform, etc. into a single, high-capacity intelligent switching system providing Layer 0, 1, and 2 consolidation. In another exemplary embodiment, the node 110-1 can be any of an OTN add/drop multiplexer (ADM), a SONET/SDH ADM, a multi-service provisioning platform (MSPP), a digital cross-connect (DCS), an optical cross-connect, an optical switch, a router, a switch, a WDM terminal, an access/aggregation device, etc. That is, the node 110-1 can be any digital system with ingress and egress digital signals and switching therebetween of channels, timeslots, tributary units, etc. utilizing OTN. While the node 110-1 is generally shown as an optical network element, the OTN systems and methods are contemplated for use with any switching fabric, network element, or network based thereon.

In an exemplary embodiment, the node 110-1 includes common equipment 310, one or more line modules 320, and one or more switch modules 330. The common equipment 310 can include power; a control module; operations, administration, maintenance, and provisioning (OAM&P) access; user interface ports; and the like. The common equipment 310 can connect to a management system 350 through a data communication network 360. The management system 350 can include a network management system (NMS), element management system (EMS), or the like. Additionally, the common equipment 310 can include a control plane processor configured to operate a control plane as described herein. The node 110-1 can include an interface 370 for communicatively coupling the common equipment 310, the line modules 320, and the switch modules 330 therebetween. For example, the interface 370 can be a backplane, mid-plane, a bus, optical or electrical connectors, or the like. The line modules 320 are configured to provide ingress and egress to the switch modules 330 and external to the node 110-1. In an exemplary embodiment, the line modules 320 can form ingress and egress switches with the switch modules 330 as center stage switches for a three-stage switch, e.g. a three stage Clos switch. Other configurations and/or architectures are also contemplated. The line modules 320 can include optical transceivers, such as, for example, 1 Gb/s (GbE PHY), 2.5 Gb/s (OC-48/STM-1, OTU1, ODU1), 10 Gb/s (OC-192/STM-64, OTU2, ODU2, 10 GbE PHY), 40Gb/s (OC-768/STM-256, OTU3, ODU3, 40 GbE PHY), 100 Gb/s (OTU4, ODU4, 100 GbE PHY), etc.

Further, the line modules 320 can include a plurality of optical connections per module and each module may include a flexible rate support for any type of connection, such as, for example, 155 Mb/s, 622 Mb/s, 1 Gb/s, 2.5 Gb/s, 10 Gb/s, 40 Gb/s, and 100 Gb/s, and any rate in between. The line modules 420 can include wavelength division multiplexing interfaces, short reach interfaces, and the like, and can connect to other line modules 320 on remote network elements, end clients, edge routers, and the like. From a logical perspective, the line modules 320 provide ingress and egress ports to the node 110-1, and each line module 320 can include one or more physical ports. The switch modules 330 are configured to switch channels, timeslots, tributary units, etc. between the line modules 320. For example, the switch modules 330 can provide wavelength granularity (Layer 0 switching), SONET/SDH granularity such as Synchronous Transport Signal-1 (STS-1) and variants/concatenations thereof (STS-n/STS-nc), Synchronous Transport Module level 1 (STM-1) and variants/concatenations thereof, Virtual Container 3 (VC3), etc.; OTN granularity such as Optical Channel Data Unit-1 (ODU1), Optical Channel Data Unit-2 (ODU2), Optical Channel Data Unit-3 (ODU3), Optical Channel Data Unit-4 (ODU4), Optical Channel Data Unit-flex (ODUflex), Optical channel Payload Virtual Containers (OPVCs), ODTUGs, etc.; Ethernet granularity; Digital Signal n (DSn) granularity such as DS0, DS1, DS3, etc.; and the like. Specifically, the switch modules 330 can include both Time Division Multiplexed (TDM) (i.e., circuit switching) and packet switching engines. The switch modules 330 can include redundancy as well, such as 1:1, 1:N, etc. In an exemplary embodiment, the switch modules 330 provide OTN switching.

Those of ordinary skill in the art will recognize the node 110-1 can include other components which are omitted for illustration purposes, and that the systems and methods described herein are contemplated for use with a plurality of different network elements with the node 110-1 presented as an exemplary type of network element. For example, in another exemplary embodiment, the node 110-1 may not include the switch modules 330, but rather have the corresponding functionality in the line modules 320 (or some equivalent) in a distributed fashion. For the node 110-1, other architectures providing ingress, egress, and switching therebetween are also contemplated for the systems and methods described herein. In general, the systems and methods described herein contemplate use with any network element providing switching of OTN channels, timeslots, tributary units, etc.

Figure 9:
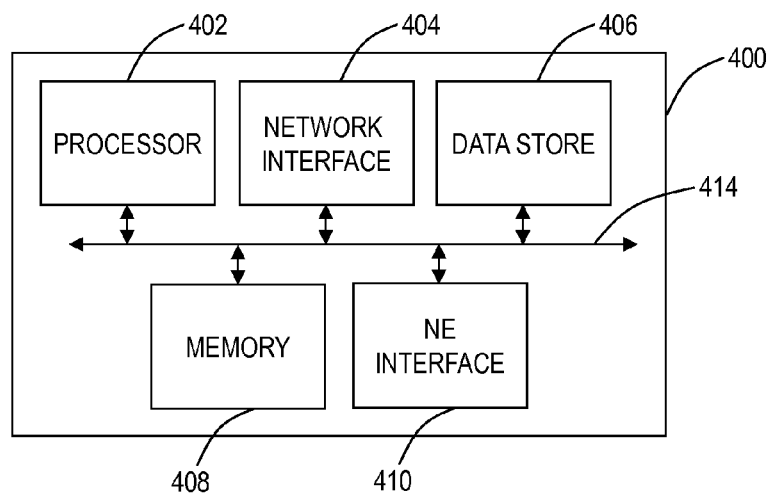
FIG. 9 is a block diagram of a controller to provide control plane processing and/or operations, administration, maintenance, and provisioning (OAM&P) for a node such as the node of FIG. 8.

Referring to FIG. 9, in an exemplary embodiment, a block diagram illustrates a controller 400 to provide control plane processing and/or operations, administration, maintenance, and provisioning (OAM&P) for a node such as the node 110-1. The controller 400 can be part of common equipment, such as common equipment 310 in the node 110-1. The controller 400 can include a processor 402 which is hardware device for executing software instructions such as operating the control plane. The processor 402 can be any custom made or commercially available processor, a central processing unit (CPU), an auxiliary processor among several processors associated with the controller 400, a semiconductor-based microprocessor (in the form of a microchip or chip set), or generally any device for executing software instructions.

When the controller 400 is in operation, the processor 402 is configured to execute software stored within memory, to communicate data to and from the memory, and to generally control operations of the controller 400 pursuant to the software instructions. The controller 400 can also include a network interface 404, a data store 406, memory 408, a network element interface 410, and the like, all of which are communicatively coupled therebetween and with the processor 402.

The network interface 404 can be used to enable the controller 400 to communicate on a network, such as to communicate control plane information to other controllers, to the management system 360, and the like. The network interface 404 can include, for example, an Ethernet card (e.g., 10BaseT, Fast Ethernet, Gigabit Ethernet) or a wireless local area network (WLAN) card (e.g., 802.11a/b/g). The network interface 404 can include address, control, and/or data connections to enable appropriate communications on the network. The data store 406 can be used to store data, such as control plane information, provisioning data, OAM&P data, etc. The data store 406 can include any of volatile memory elements (e.g., random access memory (RAM, such as DRAM, SRAM, SDRAM, and the like)), nonvolatile memory elements (e.g., ROM, hard drive, flash drive, CDROM, and the like), and combinations thereof. Moreover, the data store 406 can incorporate electronic, magnetic, optical, and/or other types of storage media. The memory 408 can include any of volatile memory elements (e.g., random access memory (RAM, such as DRAM, SRAM, SDRAM, etc.)), nonvolatile memory elements (e.g., ROM, hard drive, flash drive, CDROM, etc.), and combinations thereof. Moreover, the memory 408 may incorporate electronic, magnetic, optical, and/or other types of storage media. Note that the memory 408 can have a distributed architecture, where various components are situated remotely from one another, but may be accessed by the processor 402.

The network element interface 410 includes components for the controller 400 to communicate to other devices in a node, such as through the local interface 370. The components (402, 404, 406, 408, 410) are communicatively coupled via a local interface 414. The local interface 414 and the network element interface 410 can be, for example but not limited to, one or more buses or other wired or wireless connections, as is known in the art. The local interface 414 and the network element interface 410 can have additional elements, which are omitted for simplicity, such as controllers, buffers (caches), drivers, repeaters, and receivers, among many others, to enable communications. Further, the local interface 414 and the network element interface 410 can include address, control, and/or data connections to enable appropriate communications among the aforementioned components.

In conjunction with the node 110-1 and the controller 400, it will be appreciated that some exemplary embodiments described herein may include one or more generic or specialized processors ("one or more processors") such as microprocessors, digital signal processors, customized processors, and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application specific integrated circuits (ASICs), in which each function or some combinations of certain of the functions are implemented as custom logic. Of course, a combination of the aforementioned approaches may be used. Moreover, some exemplary embodiments may be implemented as a non-transitory computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor that, in response to such execution, cause a processor or any other circuitry to perform a set of operations, steps, methods, processes, algorithms, etc.

In various exemplary embodiments, the node 110-1 is configured to support the systems and methods described herein through configuration of the modules 310, 320, 330. For example, the method 200 can be implemented through the common equipment 310, the line modules 320, and the switch modules 330. In an exemplary embodiment, the common equipment 310 can be configured to provide bandwidth advertisement updates to other nodes 110. The common equipment 310 can track available capacity on all links 120 associated with the node 110-1 through the line modules 310. The common equipment 310 can implement the method 200 to reduce bandwidth updates as described herein. Additionally, the controller 400 can be configured to implement the method 200.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure and are intended to be covered by the following claims.

What is claimed is:

1. A bandwidth advertisement update method used in a control plane of an optical network, comprising:
defining a plurality of bandwidth update threshold values for a plurality of bandwidth units supported on a link in the optical network, wherein the plurality of bandwidth update threshold values are managed independently of one another, wherein the plurality of bandwidth units have different sizes, and wherein the link is a virtual object used by the control plane to represent one or more lines that are physical connections between nodes in the optical network and the plurality of bandwidth units are either on a same line or spread across more than one line;
initially advertising a bandwidth advertisement comprising; the bandwidth update threshold values for each of the plurality of bandwidth units when no traffic is provisioned on the link;
responsive to a change in available bandwidth on the link, sending a updated bandwidth advertisement if the available bandwidth for any of the plurality of bandwidth units is less than the associated bandwidth update threshold value for the link; and
responsive to a change in available bandwidth on the link, withholding the bandwidth advertisement if the available bandwidth for all of the plurality of bandwidth units is greater than or equal to the associated bandwidth update threshold values.

2. The bandwidth advertisement update method of claim 1, further comprising:
   operating a control plane in the optical network; and
   utilizing the plurality of bandwidth update threshold values to reduce a number of bandwidth advertisements while supporting aggregated links in the control plane and bandwidth advertisements associated with the aggregated links.

3. The bandwidth advertisement update method of claim 2, wherein the aggregated links comprise a co-routed subnetwork connection comprising a plurality of physical lines.

4. The bandwidth advertisement update method of claim 2, wherein the control plane comprises Generalized Multi-Protocol Label Switching (GMPLS), and wherein the bandwidth advertisement update method is operated in compliance with Interface Switching Capability Descriptor (ISCD) messaging associated with GMPLS.

5. The bandwidth advertisement update method of claim 2, wherein the control plane comprises Automatically Switched Optical Network (ASON).

6. The bandwidth advertisement update method of claim 1, further comprising:
   setting the bandwidth update threshold value for one of the plurality of bandwidth units to zero to block provisioning of connections associated with the one of the plurality of bandwidth units on the link.

7. The bandwidth advertisement update method of claim 1, further comprising:
   setting the bandwidth update threshold value for one of the plurality of bandwidth units to a maximum value supported by the link to enable sending the bandwidth advertisement for any change in bandwidth on the link.

8. The bandwidth advertisement update method of claim 7, wherein the Optical Transport Network (OTN) bandwidth units comprise Optical channel Data Unit level k (ODUk) units.

9. The bandwidth advertisement update method of claim 1, wherein the plurality of bandwidth units comprises Optical Transport Network (OTN) bandwidth units.

10. An optical network, comprising:
    a first node connected to a second node via a link, wherein the link supports a plurality of bandwidth units thereon;
    a control plane is configured to operate between the first node and the second node; and
    wherein the first node is configured to provide bandwidth advertisement updates to other nodes based upon actual bandwidth for each of the plurality of bandwidth units on the link while constraining the bandwidth advertisement updates based upon a bandwidth update threshold value for each of the plurality of bandwidth units, wherein each of the bandwidth update threshold values are managed independently of one another, wherein, initially, the bandwidth advertisement updates are advertised as the bandwidth update threshold value for each of the plurality of bandwidth units when no traffic is provisioned on the link, wherein the plurality of bandwidth units have different sizes; and wherein the link is a virtual object used by the control plane to represent one or more lines that are physical connections between nodes in the optical network and the plurality of bandwidth units are either on a same line or spread across more than one line.

11. The optical network of claim 10, wherein the link comprises an aggregated link comprising a plurality of physical lines treated as a single link by the control plane.

12. The optical network of claim 10, wherein, responsive to a change in available bandwidth on the link, the first node is configured to send a bandwidth advertisement if the available bandwidth for any of the plurality of bandwidth units is less than the associated bandwidth update threshold update value; and
    responsive to a change in available bandwidth on the link, the first node is configured to withhold the bandwidth advertisement if the available bandwidth for all of the plurality of bandwidth units is greater than or equal to the associated bandwidth update threshold update value.

13. The optical network of claim 10, wherein the control plane comprises Generalized Multi-Protocol Label Switching (GMPLS), and wherein the bandwidth advertisement update method is operated in compliance with Interface Switching Capability Descriptor (ISCD) messaging associated with GMPLS.

14. The optical network of claim 10, wherein the plurality of bandwidth units comprise Optical Transport Network (OTN) bandwidth units.

15. The optical network of claim 14, wherein the Optical Transport Network (OTN) bandwidth units comprise Optical channel Data Unit level k (ODUk) units.

16. A controller, comprising:
    an interface communicatively coupled to at least one node in a network and to a least one port forming a link in the network;
    a processor; and
    memory storing instructions that, when executed, cause the processor to
      define a plurality of bandwidth update threshold values for a plurality of bandwidth units supported on the link in an optical network, wherein the plurality of bandwidth update threshold values are managed independently of one another, wherein the plurality of bandwidth units have different sizes, and wherein the link is a virtual object used by a control plane to represent one or more lines that are physical connections between nodes in the network and the plurality of bandwidth units are either on a same line or spread across more than one line,
    initially advertising a bandwidth advertisement comprising; the bandwidth update threshold values for each of the plurality of bandwidth units when no traffic is provisioned on the link;
    responsive to a change in available bandwidth on the link, sending a updated bandwidth advertisement if the available bandwidth for any of the plurality of bandwidth units is less than the associated bandwidth update threshold value for the link; and
    responsive to a change in available bandwidth on the link, withholding the bandwidth advertisement if the available bandwidth for all of the plurality of bandwidth units is greater than or equal to the associated bandwidth update threshold values.

17. The controller of claim 16, wherein the instructions, when executed, further cause the processor to:
    operate an optical control plane in the network; and
    utilize the bandwidth update threshold value to reduce a number of bandwidth advertisements while supporting aggregated links in the optical control plane and bandwidth advertisements associated with the aggregated links.

* * * * *